United States Patent
Mach

(10) Patent No.: US 12,022,367 B2
(45) Date of Patent: Jun. 25, 2024

(54) METHOD AND APPARATUS FOR CONTROLLING COMMUNICATION BETWEEN DEVICES IN A NETWORK

(71) Applicant: SAMSUNG ELECTRONICS CO., LTD., Suwon-si (KR)

(72) Inventor: Tomasz Mach, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/933,414

(22) Filed: Sep. 19, 2022

(65) Prior Publication Data
US 2023/0013993 A1    Jan. 19, 2023

Related U.S. Application Data

(63) Continuation of application No. 17/250,227, filed as application No. PCT/KR2019/007532 on Jun. 21, 2019, now Pat. No. 11,451,943.

(30) Foreign Application Priority Data

Jun. 22, 2018    (GB) ........................ 1810288
Oct. 12, 2018    (GB) ........................ 1816640

(51) Int. Cl.
*H04W 4/40*    (2018.01)
*H04B 17/318*  (2015.01)
(Continued)

(52) U.S. Cl.
CPC ............ *H04W 4/40* (2018.02); *H04B 17/318* (2015.01); *H04W 24/02* (2013.01); *H04W 24/08* (2013.01);
(Continued)

(58) Field of Classification Search
CPC ....... H04W 48/16; H04W 52/10; H04W 4/40; H04W 76/14; H04W 17/336
See application file for complete search history.

(56) References Cited

U.S. PATENT DOCUMENTS 9,479,371 B2  10/2016  Li et al.
9,559,804 B2  1/2017   Ibrahim et al.
(Continued)

FOREIGN PATENT DOCUMENTS

| EP | 3273634 A1    | 1/2018 |            |
|----|---------------|--------|------------|
| EP | 4057679 A1 *  | 9/2022 | H04B 17/327 |

(Continued)

OTHER PUBLICATIONS

M. Harounabadi, D. M. Soleymani, S. Bhadauria, M. Leyh and E. Roth-Mandutz, "V2X in 3GPP Standardization: NR Sidelink in Release-16 and Beyond," in IEEE Communications Standards Magazine, vol. 5, No. 1, pp. 12-21, Mar. 2021, doi: 10.1109/MCOMSTD.001.2000070. (Year: 2021).*

(Continued)

*Primary Examiner* — William D Cumming

(57) ABSTRACT

A method performed by a first user equipment (UE) in a vehicle to everything (V2X) communication system, the method comprising: measuring, at least one parameter related to signal quality between the first UE and a cellular network; identifying a first event among a preconfigured set of events based on measuring of the at least one parameter; and transmitting, to a second UE, first information including information related to the first event and second information related to the first UE, based on a trigger of the first event, wherein the first information and the second information are for a prediction of the second UE associated with a state change of the cellular network, and wherein an operation of the second UE is based on the prediction.

18 Claims, 15 Drawing Sheets

(51) Int. Cl.
  *H04W 24/02* (2009.01)
  *H04W 24/08* (2009.01)
  *H04W 24/10* (2009.01)
  *H04W 76/10* (2018.01)
  *H04W 84/00* (2009.01)

(52) U.S. Cl.
  CPC ........... *H04W 24/10* (2013.01); *H04W 76/10* (2018.02); *H04W 84/005* (2013.01)

(56) References Cited

U.S. PATENT DOCUMENTS

| | | | |
|---|---|---|---|
| 9,769,762 | B1 | 9/2017 | Murray et al. |
| 9,775,116 | B2 | 9/2017 | Abdelmonem et al. |
| 10,039,143 | B2 | 7/2018 | Fyfe et al. |
| 10,523,252 | B2 | 12/2019 | Goodman et al. |
| 10,779,279 | B2 * | 9/2020 | Takahashi ............ H04B 17/336 |
| 10,979,093 | B2 | 4/2021 | Goodman et al. |
| 2011/0034128 | A1 | 2/2011 | Kirsch |
| 2011/0128902 | A1 | 6/2011 | Guo |
| 2011/0194424 | A1 | 8/2011 | Jeong et al. |
| 2015/0189615 | A1 | 7/2015 | Rembarz et al. |
| 2016/0036558 | A1 | 2/2016 | Ibrahim et al. |
| 2016/0094934 | A1 | 3/2016 | Yang et al. |
| 2016/0174273 | A1 | 6/2016 | Ginnela et al. |
| 2016/0225259 | A1 | 8/2016 | Harris et al. |
| 2017/0154326 | A1 | 6/2017 | Jo et al. |
| 2017/0201461 | A1 | 7/2017 | Cheng et al. |
| 2017/0208560 | A1 | 7/2017 | Papa et al. |
| 2018/0018591 | A1 | 1/2018 | Shiraishi et al. |
| 2018/0124186 | A1 | 5/2018 | Zanier et al. |
| 2019/0132842 | A1 * | 5/2019 | Takahashi ............ H04B 17/336 |
| 2019/0357284 | A1 * | 11/2019 | Xu ........................ H04W 48/16 |
| 2020/0084738 | A1 | 3/2020 | Nguyen |
| 2020/0351212 | A1 | 11/2020 | Loehr et al. |
| 2021/0321233 | A1 | 10/2021 | Mach |
| 2022/0393780 | A1 * | 12/2022 | Jung .................... H04W 52/10 |
| 2023/0013993 | A1 * | 1/2023 | Mach .................... H04W 4/40 |

FOREIGN PATENT DOCUMENTS

| | | | | |
|---|---|---|---|---|
| WO | 2011016879 | A1 | 2/2011 | |
| WO | 2016103047 | A1 | 6/2016 | |
| WO | 2017033486 | A1 | 3/2017 | |
| WO | 2017173579 | A1 | 10/2017 | |
| WO | 2018039114 | A1 | 3/2018 | |
| WO | 2021012232 | A1 | 1/2021 | |
| WO | WO-2021040344 | A1 * | 3/2021 | ............ H04W 76/14 |
| WO | WO-2021091227 | A1 * | 5/2021 | ............ H04B 17/327 |

OTHER PUBLICATIONS

Intellectual Property India, "Examination report under sections 12 13 of the Patents Act," dated Sep. 28, 2022, In connection with Indian Patent Application No. 202027052578, 7 pages.
D. Garcia et al., "V2X Support in 3GPP Specifications: From 4G to 5G and Beyond," in IEEE Access, vol. 8, pp. 190946-190963, Oct. 2020.
S. Lien et al., "Enhanced LTE DevicetoDevice Proximity Services," in IEEE Communications Magazine, vol. 54, No. 12, pp. 174-182, Dec. 2016.
International Search Report and Written Opinion of the International Searching Authority in connection with International Application No. PCT/KR2019/007532 dated Sep. 26, 2019, 11 pages.
Combined Search and Examination Report dated Nov. 29, 2018 in connection with United Kingdom Application No. GB1810288.9, 7 pages.
Examination Report dated Oct. 22, 2020 in connection with United Kingdom Application No. GB1810288.9, 1 page.
3GPP TR 22.885 V14.0.0 (Dec. 2015), Technical Report, 3rd Generation Partnership Project; Technical Specification Group Services and System Aspects; Study on LTE support for Vehicle to Everything (V2X) services (Release 14), Dec. 2015, 50 pages.
3GPP TR 22.886 V15.1.0 (Mar. 2017), Technical Report, 3rd Generation Partnership Project; Technical Specification Group Services and System Aspects; Study on enhancement of 3GPP Support for 5G V2X Services (Release 15), Mar. 2017, 58 pages.
3GPP TS 36.300 V14.6.0 (Mar. 2018), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Mar. 2018, 331 pages.
3GPP TS 36.331 V14.6.2 (Apr. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 14), Apr. 2018, 766 pages.
3GPP TS 36.331 V15.0.0 (Dec. 2017), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Dec. 2017, 776 pages.
3GPP TS 36.331 V15.1.0 (Mar. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Mar. 2018, 786 pages.
ETSI EN 302 637-2 V1.3.1 (Sep. 2014), Intelligent Transport Systems (ITS); Vehicular Communications; Basic Set of Applications; Part 2: Specification of Cooperative Awareness Basic Service, Sep. 2014, 44 pages.
ETSI TR 103 562 V2.1.1 (Dec. 2019), Intelligent Transport Systems (ITS); Vehicular Communications; Basic Set of Applications; Analysis of the Collective Perception Service (CPS); Release 2, Dec. 2019, 119 pages.
SA WG1, "Study on Improvement of V2X service Handling," SP-180247 (revision of SP-180171, 230), 3GPP TSG-SA Meeting #79, Chennai, India, Mar. 2018, 3 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.1 (Jun. 2018), 791 pages.
Supplementary European Search Report dated May 21, 2021 in connection with European Patent Application No. 19 82 2103, 13 pages.
Office Action dated Oct. 19, 2023, in connection with Korean Patent Application No. 201980040383.6, 9 pages.

* cited by examiner

FIG. 8

```
LowFrequencyContainer ::=CHOICE {
    basicVehicleContainerLowFrequency BasicVehicleContainerLowFrequency,
    ...
}

BasicVehicleContainerLowFrequency ::= SEQUENCE {
    vehicleRole  VehicleRole,
    exteriorLights  ExteriorLights,
    pathHistory  PathHistory
}
```

METHOD AND APPARATUS FOR CONTROLLING COMMUNICATION BETWEEN DEVICES IN A NETWORK

CROSS-REFERENCE TO RELATED APPLICATIONS

This application is continuation of application Ser. No. 17/250,227, filed Dec. 18, 2020, now U.S. Pat. No. 11,451, 943 issued Sep. 20, 2022, which is a 371 National Stage of International Application No. PCT/KR2019/007532, filed Jun. 21, 2019, which claims priority to United Kingdom Patent Application No GB 1810288.9, filed Jun. 22, 2018, and United Kingdom Patent Application No. GB 1816640.5, filed Oct. 12, 2018, the disclosures of which are herein incorporated by reference in their entirety.

BACKGROUND

1. Field

The present invention relates to networks comprising user equipment (UE) devices and to methods of controlling such networks. In particular, the present invention relates to actions initiated by UEs responsive to information received from other UEs.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Generally, Cooperative Intelligent Transport Systems (C-ITS) supports vehicle safety applications, including driving awareness, driver warning and/or driver assistance, as well as other applications, including infotainment, for example. C-ITS is intended to be technology agnostic and hence, in principle, may use any mode of cellular communication. Vehicle to Everything Communication (V2X), including Vehicle to Vehicle (V2V), Vehicle to Infrastructure (V2I), Vehicle to Network (V2N) and Vehicle to Pedestrian (V2P) is typically used in C-ITS.

However, performance, reliability and/or usability of the communication, as defined by a Quality of Service (QoS), may be critical for ensuring, maintaining and/or enhancing safety. Hence, changes to the QoS may adversely compromise safety.

Hence, there is a need to mitigate changes to the QoS, so as to ensure, maintain and/or enhance safety, particularly in C-ITS using V2X communication.

A first aspect provides a method of controlling a network, preferably a peer-to-peer network, comprising a set of user equipment (UE) devices, including a first UE and a second UE, the method comprising:
  identifying, by the first UE, a first, preferably preconfigured, event amongst a set of events;
  transmitting, by the first UE, first information related to the identified first event;
  receiving, by the second UE, the transmitted first information; and
  initiating, by the second UE, a first action amongst a set of actions, responsive to the received first information.

A second aspect provides a network, preferably a peer-to-peer network, comprising a set of user equipment (UE) devices, including a first UE and a second UE;
  wherein the first UE is arranged to:
  identify a first, preferably preconfigured, event amongst a set of events; and
  transmit first information related to the identified first event;
  wherein the second UE is arranged to:
  receive the transmitted first information; and
  initiate a first action amongst a set of actions, responsive to the received first information.

A third aspect provides a user equipment (UE) device arranged to:
  identify a first, preferably preconfigured, event amongst a set of events; and
  transmit first information related to the identified first event.

A fourth aspect provides a user equipment (UE) device arranged to:
  receive the transmitted first information; and
  initiate a first action amongst a set of actions, responsive to the received first information.

A fifth aspect provides a tangible non-transient computer-readable storage medium having recorded thereon instructions which when implemented by a user equipment, UE, device, cause the UE device to perform a method of controlling a network, preferably a peer-to-peer network, the method according to the first aspect.

A sixth aspect provides a method of controlling a network, for example a peer-to-peer network or a cellular C-V2X network using sidelink, SL, also known as PC5 interface, comprising a set of user equipment, UE, devices, including a first UE and a second UE, the method comprising:
  determining, by the first UE, first information related to the network amongst a first set and corresponding second information related to the first UE amongst a second set;
  transmitting, by the first UE, the first information and the corresponding second information;
  receiving, by the second UE, the transmitted first information and the transmitted corresponding second information; and
  determining, by the second UE, a first state amongst a set of states of the network based on the transmitted first information and the transmitted corresponding second information, responsive to receiving the transmitted first information and the transmitted corresponding second information.

A seventh aspect provides a network, for example a peer-to-peer network or a cellular network, comprising a set of user equipment, UE, devices, including a first UE and a second UE;
  wherein the first UE is arranged to:
  determine first information related to the network and corresponding second information related to the first UE; and
  transmit the first information and the corresponding second information;
  wherein the second UE is arranged to:
  receive the transmitted first information and the transmitted corresponding second information; and
  determine a first state amongst a set of states of the network based on the transmitted first information and the transmitted corresponding second information, responsive to receiving the transmitted first information and the transmitted corresponding second information.

An eighth aspect provides a user equipment, UE, device arranged to:
  determine first information related to a network and corresponding second information related to the UE; and
  transmit the first information and the corresponding second information.

A ninth aspect provides user equipment, UE, device arranged to:
  receive first information related to a network and corresponding second information related to another UE; and
  determine a first state amongst a set of states of the network based on the transmitted first information and the transmitted corresponding second information, responsive to receiving the transmitted first information and the transmitted corresponding second information.

A tenth aspect provides a tangible non-transient computer-readable storage medium having recorded thereon instructions which when implemented by a user equipment, UE, device, cause the UE device to perform a method of controlling a network, preferably a peer-to-peer network, the method according to the sixth aspect.

It is one aim of the present invention, amongst others, to provide a method of controlling a network, preferably a peer-to-peer network, which at least partially obviates or mitigates at least some of the disadvantages of the prior art, whether identified herein or elsewhere. For example, the present invention may provide for sharing of information between user equipment (UE) devices, thereby maintaining and/or enhancing safety, for example, even if a quality of service (QoS) is degraded. Additionally and/or alternatively, if the QoS is improved, safety may be further enhanced.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:
FIG. 8 schematically depicts ASN.1 definitions.

DETAILED DESCRIPTION

Figure 1:
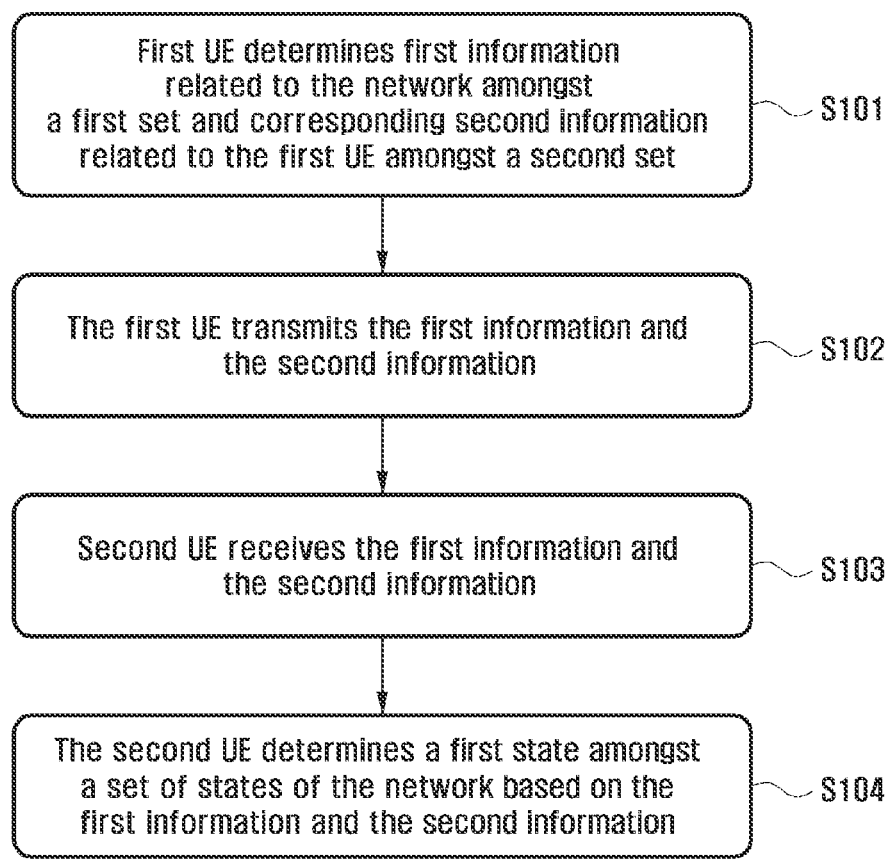
FIG. 1 schematically depicts a method of controlling a network according to an exemplary embodiment of the invention.

According to the present invention there is provided a method, a network, a user equipment (UE) device and a tangible non-transient computer-readable storage medium, as set forth in the appended claims. Other features of the invention will be apparent from the dependent claims, and the description that follows.

Method

The first aspect provides a method of controlling a network, preferably a peer-to-peer network, comprising a set of user equipment (UE) devices, including a first UE and a second UE, the method comprising:

identifying, by the first UE, a first, preferably preconfigured, event amongst a set of events;

transmitting, by the first UE, first information related to the identified first event;

receiving, by the second UE, the transmitted first information; and initiating, by the second UE, a first action amongst a set of actions, responsive to the received first information.

In this way, the second UE (i.e. a sink or a target) initiates the first action, responsive to the received first information from the first UE (i.e. a source), thereby maintaining and/or enhancing safety, for example, even if a quality of service (QoS) is degraded. That is, the first UE and the second UE operate cooperatively. That is changes to the QoS are mitigated, so as to ensure, maintain and/or enhance safety, for example in C-ITS using V2X communication.

Particularly, the inventors have determined that by anticipating or predicting changes to QoS, safety applications for example C-ITS applications may be better supported, thereby enhancing safety. For example, by adjusting V2X applications in advance of changes in QoS, reliability, performance and/or continuity of a function of the second UE may be increased.

For example, the method supports advance notification (prediction) of mobile network radio coverage changes measured on Uu interface for V2X communications to trigger proactive action in the corresponding C-ITS applications e.g. modify inter-vehicle gaps in vehicle platooning. For example, the method supports controlling a C-ITS application based on the communication QoS prediction to adjust a vehicle autonomy level as defined in SAE standard. For example, the method supports prediction of upcoming mobility events (handover or reselection) based on the information received from the surrounding vehicle(s).

QoS Prediction

As outlined above, by predicting QoS changes, safety applications, for example C-ITS applications, may be better supported. This is important because wireless communication performance may be suboptimal in some use cases due to the variable mobile network radio signal coverage on the road. QoS performance indicators relevant to safety applications, for example C-ITS applications, include mobile network coverage, latency, reliability and bitrate, as described below in more detail.

The Radio Resource Control (RRC) protocol, for legacy 3GPP (non-vehicle LTE or 5G New Radio (NR)) User Equipment (UE), may support:

Broadcast of System Information related to the access stratum (AS);

Mobility functions including:

UE measurement reporting and control of the reporting for inter-cell and inter-RAT mobility;

Handover;

UE cell selection and reselection and control of cell selection and reselection;

Context transfer at handover;

QoS management functions;

UE measurement reporting and control of the reporting.

Generally and as described below in more detail, measurements, to be performed by UEs, of QoS performance indicators for example, for intra/inter-frequency mobility and/or for Inter-system (Radio Access Technology (RAT)) mobility such as between 4G and 5G, may be controlled by the mobile network, using broadcast or dedicated control signalling sent on a control channel, for example. Intra-frequency neighbour (cell) measurements are neighbour cell measurements performed by the UEs when the current and a target cell operates on the same carrier frequency. Typically in cellular networks, mobility within the same frequency layer (i.e. between cells with the same carrier frequency) is predominant. Good neighbour cell measurements are needed for cells that have the same carrier frequency as the serving cell in order to ensure good mobility support and easy network deployment. Search for neighbour cells with the same carrier frequency as the serving cell, and measurements of the relevant quantities for identified cells are needed. The UEs report measurement information in accordance with the measurement configuration as provided by the network which gives the measurement configuration applicable for a UE by dedicated signalling, for example using a RRCConnectionReconfiguration or a RRCConnectionResume message. The UEs may be requested to perform the following types of measurements:

1. Intra-frequency measurements: measurements at the downlink carrier frequency(ies) of the serving cell(s);
2. Inter-frequency measurements: measurements at frequencies that differ from any of the downlink carrier frequency(ies) of the serving cell(s);
3. Inter-RAT measurements of other frequencies e.g. GSM, 3G etc.

However, conventional 3GPP QoS architecture, for example, does not support advance notification (prediction) of mobile network coverage changes for V2X communications to support C-ITS applications. This is solved, at least in part, by the method according to the first aspect and/or the second, third and/or fourth aspects.

UE

Generally, in Universal Mobile Telecommunications System (UMTS) and 3GPP Long Term Evolution (LTE), UE devices allow users to access network services. In other words, a UE is any device used by a user to communicate on a network. The UE, for example the first UE and the second UE, may be, for example, a device comprising a transmitter and a receiver or a transceiver, such as a mobile telephone or a laptop computer equipped with a mobile broadband adapter. The user may be a human user or a non-human user, for example a vehicle or infrastructure.

It should be understood that the first UE and the second UE are interchangeable. Additionally and/or alternatively, a particular UE, for example the first UE and/or the second UE, of the set of UE devices may function as both a first UE and a second UE, successively and/or simultaneously. In one example, the set of UE devices comprises more than 2 UEs, for example 3, 4, 5, 6, 7, 8, 9, 10 or more UEs. In one example, the set of UE devices comprises N UEs where N is a natural number greater than 1. Each of the UEs of the set of UE devices may be as described with respect to the first UE and/or the second UE.

Network

The network is preferably a peer-to-peer (P2P) network, particularly a mobile P2P (also known as cellular) network.

Generally, P2P networks have distributed network architectures composed of participants that make a portion of their resources (such as processing power, disk/cache storage or network bandwidth) available to other network participants. Generally, peers are entities (e.g. UEs, network entities) of both suppliers and consumers of resources, in contrast to traditional client-server models where only servers supply, and clients consume. Generally, user peers are a UE type of participants in the P2P network both providing services to other participants and requesting services from other participants. Generally, network peers are the participants in the P2P network deployed and controlled by operators/service providers both providing services to other participants (e.g. user peers or network peers) and requesting services from other participants, e.g. the cache server deployed by operators/service providers.

In one example, the network communicates via Cellular V2X (C-V2X).

Vehicle-to-everything (V2X) communication provides real-time and highly reliable information flows to enable safe, efficient and environmentally-conscious transportation services and paving the way to connected and automated driving (CAD). Cellular V2X (C-V2X) is the technology developed in 3GPP1 and is designed to operate in two modes:

1. Device-to-device: This is Vehicle-to-Vehicle (V2V), Vehicle-to-(Roadway) Infrastructure (V2I) and Vehicle-to-Pedestrian (V2P) direct communication without necessarily relying on network involvement for scheduling;
2. Device-to-network: This is Vehicle-to-Network (V2N) communication which uses the traditional cellular links to enable cloud services to be part of the end-to-end solution by means of network slicing architecture for vertical industries.

V2X may provide the performance to meet use cases such as intersection movement assist, emergency electronic brake light, forward collision warning, blind spot warning, lane change warning, as well as Advanced Driver Assistance Systems (ADAS), where vehicles may cooperate, coordinate and share sensed information.

C-V2X is based on 3GPP Release 14 and is considered superior to IEEE 802.11p, with respect to coverage, mobility support, delay, reliability and scalability, making C-V2X a suitable candidate in the 5.9 GHz ITS spectrum to meet the near-term vehicular communication requirements. C-V2X provides both device-to-device (V2V, V2I and V2P) and device-to-network (V2N) services. C-V2X is described in more detail below.

In one example, communication between the first UE and the second UE is via a sidelink (SL), for example a PC5 sidelink radio interface, preferably using C-V2X, as described in more detail below.

Additionally and/or alternatively, the network may be and/or comprise and/or provide a master-slave or a client-server type of relationship between the transmitting first UE and the receiving second UE. This may be beneficial when for cooperative services between the first UE and the second UE, for example cooperative manoeuvres including a first vehicle and a second vehicle, including the first UE and the second UE respectively. Such a master-slave or a client-server type of relationship may require an initial handshake connection agreement. Subsequently, the master or server may configure a measurement event in the slave or client, respectively, and then the slave or client reports when triggered.

In one example, the network comprises and/or is a Radio Access Network including one or more base stations. In one example, the network provides and/or supports core network routing traffic between base stations.

The first UE and/or the second UE may connect to or communicate with or via an access point (AP) for example a Universal Terrestrial Radio Access Network (UTRAN) access point such as a base station Node B (Node B or NB) and/or an evolved base station Node B (eNodeB or eNB and/or a gNodeB (gNB). That is, the first UE and/or the second UE may trnsmit data to and/or receive data from the access point, as described below. Furthermore, the UE may connect to or communicate with or via another such UE device.

It should be understood that a cell may be a radio network object that may be uniquely identified by the UE device from a cell identification that is broadcast over a geographical area from one UTRAN access point. A cell may be in either Frequency Division Duplex (FDD) or Time Division Duplex (TDD) mode.

It should be understood that a sector may be a sub-area of a cell. All sectors within the cell may be served by the same access point. A radio link within the sector may be identified by a single logical identification belonging to the sector.

In one example, the network comprises and/or is a mobile ad hoc network (MANET). Generally, MANETs (also known as wireless ad hoc networks or ad hoc wireless networks), comprise continuously self-configuring, infrastructure-less networks of mobile devices (for example UEs) connected wirelessly. Each device in a MANET is free to move independently in any direction, and will therefore change its links to other devices frequently (i.e. ad hoc). MANETs may operate independently or may be connected to the Internet. MANETs may include one or multiple and different transceivers between nodes. Hence, MANETs may provide highly dynamic, autonomous topologies.

In one example, the MANET comprises and/or is a vehicular ad hoc networks (VANET), an intelligent vehicular ad hoc network (InVANET), a smart phone ad hoc networks (SPAN), an internet-based mobile ad-hoc networks (iMANET), a hub-spoke MANET and/or a flying ad hoc networks (FANET).

Vehicular ad hoc networks (VANETs) are used for communication between vehicles and roadside equipment. Intelligent vehicular ad hoc networks (InVANETs) are a kind of artificial intelligence that helps vehicles to behave in intelligent manners during vehicle-to-vehicle collisions, accidents. Smart phone ad hoc networks (SPANs) leverage the existing hardware (primarily Bluetooth and Wi-Fi) in commercially available smart phones to create peer-to-peer networks without relying on cellular carrier networks, wireless access points, or traditional network infrastructure. SPANs differ from traditional hub and spoke networks, such as Wi-Fi Direct, in that they support multi-hop relays and there is no notion of a group leader so peers can join and leave at will without destroying the network. Internet-based mobile ad-hoc networks (iMANETs) is a type of wireless ad hoc network that supports Internet protocols such as TCP/UDP and IP. The network uses a network-layer routing protocol to link mobile nodes and establish routes distributedly and automatically. Multiple sub-MANETs may be connected in a classic Hub-Spoke VPN to create a geographically distributed MANET, known as a Hub-Spoke MANET. In such type of networks normal ad hoc routing algorithms does not apply directly. Flying ad hoc networks (FANETs) are composed of unmanned aerial vehicle, allowing great mobility and providing connectivity to remote areas.

Event

The first UE identifies a first, preferably preconfigured, event amongst the set of events. In one example, the set of events comprises more than 1 event, for example 2, 3, 4, 5, 6, 7, 8, 9, 10 or more events. In one example, the set of events comprises M events where M is a natural number greater than 0. Each of the events of the set of events may be as described with respect to the first event.

In one example, the first event is a preconfigured first event, wherein the method comprises preconfiguring the first event by, for example, the network, the second UE and/or a manufacturer of the first UE or a vehicle manufacturer (OEM). In one example, the preconfigured first event may include cell identification information relating to which measurement and/or measurements the first event is triggered.

In one example, the first event is defined by a radio resource control (RRC) protocol, for example as shown in Table 1. In one example, the set of events comprises and/or consists of the RRC events as shown in Table 1.

TABLE 1

RRC event definitions.

| Event | Description |
|---|---|
| A1 | Serving becomes better than threshold |
| A2 | Serving becomes worse than threshold |
| A3 | Neighbour becomes offset better than PCell |
| A4 | Neighbour becomes better than threshold |
| A5 | PCell becomes worse than threshold and neighbour becomes better than threshold2 |
| A6 | Neighbour becomes offset better than SCell |
| C1 | CSI-RS resource becomes better than threshold |
| C2 | CSI-RS resource becomes offset better than reference CSI-RS resource |
| B1 | Inter RAT neighbour becomes better than threshold |
| B2 | PCell becomes worse than threshold and inter RAT neighbour becomes better than threshold2 |
| W1 | WLAN becomes better than a threshold |
| W2 | All WLAN inside WLAN mobility set becomes worse than threshold and a WLAN outside WLAN mobility set becomes better than thresholds |
| W3 | All WLAN inside WLAN mobility set becomes worse than a threshold |
| V1 | The channel busy ratio is above a threshold |
| V2 | The channel busy ratio is below a threshold |

Typically, mobile network coverage changes are reported from the UE to the network on a Uu interface by a RRC protocol cell measurement reporting mechanism to prepare and trigger cell handover. To better inform the network about the coverage changes, different types of measurement events are preconfigured by the network in RRC protocol messages and reported by the UE Measurement Report message which can include serving cell, neighbour cells, etc., as described below in more detail. Particularly, different type of events may be specified in the RRC protocol e.g. Event A1/A2—'Serving cell becomes better/worse than threshold', Event A4-'Neighbour cell becomes better than threshold'.

In one example, the transmitting of the first information is periodic, for example having a frequency in a range from 1 Hz to 10 Hz. In one example, the transmitting of the first information is periodic over a predetermined period of time, for example in a range from 1 s to 100 s, during which the first UE and the second UE are within mutual transmitting and/or receiving range. In one example, the transmitting of the first information is responsive to (i.e. triggered by) the identifying, by the first UE, the first event amongst the set of events. In one example, the method comprises triggering the first event. In one example, the method comprises filtering the first event, thereby improving reliability thereof. In one example, the method comprises allowing for hysteresis before triggering the first event and/or before transmitting the first information.

In one example, the event is based on a Reference Signal Strength Indicator, RSSI, a Reference Signal Received Power, RSRP, and/or a Reference Signal Received Quality, RSRQ, message, as described below.

Measurement of Parameters

In one example, the method comprises:
measuring, by the first UE, a first parameter amongst a set of parameters;
wherein identifying the first event comprises comparing the measured first parameter with a first threshold parameter amongst a corresponding set of threshold parameters and/or a measured second parameter; and
wherein the first information comprises a first identifier of the first event amongst a corresponding set of identifiers.

In one example, the set of parameters comprises more than 1 parameter, for example 2, 3, 4, 5, 6, 7, 8, 9, 10 or more parameters. In one example, the set of parameters comprises P parameter where P is a natural number greater than 0. Each of the parameters of the set of parameters may be as described with respect to the first event.

In this way, the first UE measures (i.e. a value of) the first parameter, for example a RSRP as described below, and if the measured first parameter is less than, equal to or greater than, for example, the first threshold parameter, for example a threshold RSRP, the first event is identified accordingly. In one example, the first threshold parameter is a predetermined first threshold parameter. In one example, the method comprises measuring, by the first UE, the second parameter (i.e. the measured second parameter), as described with respect to the first parameter. Such comparison between the measured first parameter and the measured second parameter applies, for example, to an event in which a neighbour cell becomes better than a serving cell.

In one example, the first parameter comprises a radio signal, for example a Reference Signal Strength Indicator, RSSI, a Reference Signal Received Power, RSRP, a Reference Signal Received Quality, RSRQ, a latency, a bitrate and/or a data buffer occupancy rate and/or a detector signal, for example provided by an imaging detector, a RADAR detector and/or a LIDAR detector.

Reference Signal Strength Indicator (RSSI), Reference Signals Received Power (RSRP) and Reference Signal Received Quality (RSRQ) are measures of signal level and quality for mobile networks, such as LTE networks. In mobile networks, when a mobile device moves from cell to cell and performs cell selection/reselection and handover, the device preferably measures the signal strength/quality of the neighbour cells.

Reference Signal Received Power (RSRP) is a Received Signal Strength Indicator (RSSI) type of measurement. RSRP is the power of the LTE Reference Signals spread over the full bandwidth and narrowband. A minimum of −20 dB SINR (of the S-Synch channel) is needed to detect RSRP/RSRQ. Generally, QoS increases if RSRP increases while QoS decreases if RSRP decreases.

Reference Signal Received Quality (RSRQ) is the quality considering also RSSI and the number of used Resource Blocks (N) RSRQ=(N*RSRP)/RSSI measured over the same bandwidth. RSRQ is a carrier to interference (C/I) type of measurement and it indicates the quality of the received reference signal. The RSRQ measurement provides additional information when RSRP is not sufficient to make a reliable handover or cell reselection decision, for example.

Generally, QoS increases if RSRQ increases while QoS decreases if RSRQ decreases.

Generally, the latency is a time delay in data transmission between one node and another node, for example between the first UE and the second UE. In mobile communications, two different types of latency may be measured: C-Plane latency and U-Plane latency. In one example, the first parameter comprises C-Plane latency and/or U-Plane latency. Generally, QoS increases if the latency decreases while QoS decreases if the latency increases.

Generally, QoS increases if the bitrate increases while QoS decreases if the bitrate decreases.

Generally, QoS increases if the data buffer occupancy rate decreases while QoS decreases if the data buffer occupancy rate increases.

The detector signal may be provided, for example, by an imaging detector, a RADAR detector and/or a LIDAR detector. Imaging detectors include, for example, cameras and video cameras. The detector signal may include, for example, an obstacle for example an obstruction, a vehicle such as a stationary vehicle and/or a pedestrian. Hence, measuring the first parameter comprises detecting the detector signal and identifying the first event comprises determining whether an obstacle is included in the detector signal, such that the first information comprises the first identifier of the obstacle.

In one example, the first information comprises data related to the first UE, for example a type, a speed, a location, an acceleration, a heading or a bearing (for example northbound, southbound, eastbound, westbound) and/or a lane. For example, if the first UE is a vehicle, the first information may comprise a type, a speed, a location, an acceleration, a heading or a bearing and/or a lane of the vehicle. In one example, the first information comprises data related to a mobile network cell related to the triggered first event, for example a type of a system such as 4G/LTE or 5G/New radio, a radio frequency used and/or a cell identifier at a physical layer (e.g. Physical Cell ID in LTE) on that frequency, a cell bandwidth, etc.

Transmitting and Receiving

The first UE transmits the first information related to the identified first event. It should be understood that the first UE comprises and/or is a transmitter.

The second UE receives the transmitted first information. It should be understood that the second UE comprises and/or is a receiver.

Generally, depending on a type of connection and/or architecture thereof, two communication modes are defined for V2X: Direct V2X Communication and Indirect V2X Communication.

Direct V2X Communication is typically used for shorter range communication (e.g. up to 500 m). Direct V2X Communication may be based, for example, on the IEEE 802.11p standard in the US (similar to Wi-Fi technology but extended to vehicles), which may also be known as DSRC or ETSI ITS-G5 in Europe. Cellular V2X (C-V2X) technology based on 3GPP LTE Rel-14 (or Rel-15 New Radio) standard using LTE or NR PC5 interface may be used alternatively. Due to a direct radio link between two V2X devices, for example the first UE and the second UE, and/or a short communication range, this mode is typically more suitable for road safety applications requiring low latency and high reliability radio communication.

Indirect V2X Communication is typically used for longer range communication (e.g. more than 500 m). Indirect V2X Communication may be based, for example, on cellular 3GPP Long Term Evolution (LTE) Rel-14 standard using C-V2X Uu radio interface or future 5G New Radio based interface. By leveraging coverage of mobile network infrastructures, the communication range of this mode may be extended significantly beyond 500m. Since the mobile network elements (e.g. nodes) behave and/or are communication intermediaries between the communicating objects, this mode may also be known as V2N2V (Vehicle to Network to Vehicle) or V2N2P (Vehicle to Network to Pedestrian), for example. This indirect mode requires mobile network coverage and is typically more suitable to C-ITS applications having less stringent latency requirements.

Typically, a Uu interface is used for UE to network communication and a PC5 interface is used for UE to UE communication.

In one example, the transmitting comprises transmitting via a sidelink (SL), for example a PC5 sidelink radio interface, using C-V2X. In one example, the receiving comprises receiving via a sidelink (SL), for example a PC5 sidelink radio interface, using C-V2X.

These V2X communication modes may be used to transmit messages, for example ETSI Cooperative Awareness Messages (CAM) or SAE Basic Safety Messages (BSM), including safety critical or operational information, for example vehicle type, speed, location, acceleration, heading, physical vehicle parameters, to enhance safety by supporting C-ITS applications, avoiding vehicle collisions, improving transport efficiency and comfort (driving assistance) or supporting cooperative driving (i.e. vehicle platooning). Hence, by tracking neighbouring vehicle location and updates based on the received messages, for example CAM or BSM, safety may be enhanced. These messages may be broadcast, for example periodically at a frequency in a range of typically 1 to 10 Hz.

Additionally and/or alternatively, a combination of inputs from other vehicle sensors may be also used, for example camera, RADAR and/or LIDAR, to support identification of various road objects in Local Dynamic Map, to support Advanced Driver-Assistance Systems (ADAS) and/or higher levels of autonomous driving, as described in more detail below.

In one example, the transmitting and/or the receiving the first information is via Direct V2X Communication. In one example, the transmitting and/or the receiving the first information is via Indirect V2X Communication. In one example, the first UE and/or the second UE supports Direct V2X Communication and Indirect V2X Communication and the method comprises selecting, for example dynamically, transmitting and/or receiving via Direct V2X Communication or Indirect V2X Communication. In this way, a mode more suitable to the supported C-ITS application and its communication context may be selected.

In one example, the transmitting, by the first UE, the first information related to the identified first event comprises broadcasting and/or multicasting, by the first UE, the first information related to the identified first event. In this way, the first information may be shared by the first UE and optionally other UEs amongst the set of UE devices, without establishing a specific connection there between.

In one example, the transmitting, by the first UE, the first information related to the identified first event comprises establishing a connection, for example a direct connection, between the first UE and the second UE. In this way, the first UE and the second UE may communicate, for example directly and/or bidirectionally. In one example, the transmitting, by the first UE, the first information related to the identified first event comprises establishing a connection and/or a set of connections, for example a direct connection and/or a set of direct connections, between the first UE and a plurality of UEs, for example the set of UE devices (not including the first UE), for example a subset of the set of UE devices, such as included in a vehicle platoon. Methods of establishing connections between UE devices are known.

Action

The method comprises initiating, by the second UE, the first action amongst the set of actions, responsive to the received first information. In one example, the set of actions comprises more than 1 action, for example 2, 3, 4, 5, 6, 7, 8, 9, 10 or more actions. In one example, the set of actions comprises Q actions where Q is a natural number greater than 0. Each of the actions of the set of actions may be as described with respect to the first action.

In one example, the method comprises checking, by the second UE, if the first UE and the second UE use a same mobile network cell, for example by comparing a cell downlink carrier frequency and/or a physical cell identifier, before initiating the first action. In one example, the first information comprises the cell downlink carrier frequency and/or the physical cell identifier. In one example, the initiating the first action is if the first UE and the second UE use the same mobile network cell.

In one example, the first action comprises a safety action; and wherein initiating, by the second UE, the first action comprises invoking a safety application, for example a Cooperative Intelligent Transport Systems, C-ITS, application and/or an Advanced Driver-Assistance Systems, ADAS, application. In this way, a safety of the second UE may be improved and/or maintained, responsive to the received first information.

Generally, Cooperative Intelligent Transport Systems (C-ITS) (also known as 'connected vehicles') allow vehicles to communicate with other vehicles and infrastructure, such as traffic signals, that are fitted with the same system. In this way, the second UE may receive alerts (i.e. the first information) from the first UE, for example about upcoming hazards and/or traffic signal information. The C-ITS application may use the first information to determine if a conflict is likely, based on comparing a location, a direction and/or a speed of the first UE with that included in the first information, for example.

In one example, the initiating, by the second UE, the first action comprises modifying a bitrate usage of the second UE. In this way, the bitrate usage of the second UE may be controlled, for example to maintain a bitrate availability (i.e. bandwidth) for a safety application, such as the C-ITS application and/or the ADAS application, so as to maintain safety of the second UE while attenuating, for example reducing, a bitrate availability for a non-safety application, for example media streaming and/or entertainment. When the bitrate availability increases and/or is restored, the bitrate availability for the non-safety application may be increased and/or restored.

In one example, the first UE is included in and/or comprises a first vehicle and wherein the second UE is included and/or comprises in a second vehicle. Examples of vehicles include bicycles, motorcycles, cars, buses, vans (also known as light goods vehicles), lorries or trucks (also known as heavy goods vehicles) and commercial vehicles, such as fork lift trucks, diggers, snow ploughs, etc. (i.e. road vehicles).

In one example, the initiating, by the second UE, the first action comprises modifying a speed, a location, an acceleration, a heading or a bearing, a lane and/or a spacing thereof. In this way, a path or route of the second vehicle may be adjusted pre-emptively, responsive to the received first information, thereby avoiding an obstruction for example. In this way, safety and/or road efficiency may be improved.

In one example, the initiating, by the second UE, the first action comprises modifying an autonomy level of the second vehicle and/or alerting an occupant (i.e. a user, a driver) of the second vehicle. In this way, safety of the second vehicle may be maintained and/or enhanced. For example, an autonomy level of the second vehicle may be decreased if a QoS is degraded or may be increased if the QoS is improved. For example, by alerting the occupant of the second vehicle, vehicle control handover from a motor vehicle driving automation system to the occupant may be anticipated.

The autonomy level of the second vehicle may be as defined by SAE International J3016, Taxonomy and Definitions for Terms Related to On-Road Motor Vehicle Automated Driving Systems, which defines motor vehicle driving automation systems that perform part or all of the dynamic driving task (DDT) on a sustained basis and that range in level from no driving automation (level 0) to full driving automation (level 5) (Table 2).

In one example, the autonomy level is decreased, for example from level 3 or higher to level 2 or lower, if the QoS is decreased. For example, if the RSRP, the RSRQ and/or the bitrate are decreased and/or the latency and/or the data buffer occupancy rate increased, thereby degrading the QoS, the autonomy level may be decreased such that the human driver performs further driving tasks. In one example, the autonomy level is increased, for example from level 2 or lower to level 3 or higher if the QoS is increased. For example, if the RSRP, the RSRQ and/or the bitrate are increased and/or the latency and/or the data buffer occupancy rate decreased, thereby improving the QoS, the autonomy level may be increased such that the human driver performs fewer driving tasks.

In one example, the initiating, by the second UE, the first action comprises cell reselection or cell handover or preparation for initiating those procedures e.g. additional neighbour cell measurements in the second UE.

Autonomy levels for vehicles.

| Level | Name | Description |
| --- | --- | --- |
| Human driver monitors the driving environment | | |
| 0 | No Automation | the full-time performance by the human driver of all aspects of the dynamic driving task, even when enhanced by warning or intervention systems |
| 1 | Driver Assistance | the driving mode-specific execution by a driver assistance system of either steering or acceleration/deceleration using information about the driving environment and with the expectation that the human driver perform all remaining aspects of the dynamic driving task |

-continued

Autonomy levels for vehicles.

| Level | Name | Description |
|---|---|---|
| 2 | Partial Automation | the driving mode-specific execution by one or more driver assistance systems of both steering and acceleration/deceleration using information about the driving environment and with the expectation that the human driver perform all remaining aspects of the dynamic driving task |

Automated driving system ("system") monitors the driving environment

| | | |
|---|---|---|
| 3 | Conditional Automation | the driving mode-specific performance by an automated driving system of all aspects of the dynamic driving task with the expectation that the human driver will respond appropriately to a request to intervene |
| 4 | High Automation | the driving mode-specific performance by an automated driving system of all aspects of the dynamic driving task even if a human driver does not respond appropriately to a request to intervene |
| 5 | Full Automation | the full-time performance by an automated driving system of all aspects of the dynamic driving task under all roadway and environmental condtions that can be managed by a human driver |

Network

The second aspect provides a network, preferably a peer-to-peer network-, comprising a set of user equipment (UE) devices, including a first UE and a second UE;
  wherein the first UE is arranged to:
    identify a first event, preferably preconfigured, amongst a set of events; and
    transmit first information related to the identified first event;
  wherein the second UE is arranged to:
    receive the transmitted first information; and
    initiate a first action amongst a set of actions, responsive to the received first information.

The network, the set of UE devices, the first UE, the second UE, the first event, the set of events, the first information, the first action and/or the set of actions may be as described with respect to the first aspect. The network, the first UE and/or the second UE may implement any method or step thereof described with respect to the first aspect.

UE Devices

The third aspect provides a user equipment (UE) device arranged to:
  identify a first, preferably preconfigured, event amongst a set of events; and
  transmit first information related to the identified first event.

The fourth aspect provides a user equipment (UE) device arranged to:
  receive the transmitted first information; and
  initiate a first action amongst a set of actions, responsive to the received first information.

The network, the set of UE devices, the first UE, the second UE, the first event, the set of events, the first information, the first action and/or the set of actions may be as described with respect to the first aspect. The network, the first UE and/or the second UE may implement any method or step thereof described with respect to the first aspect.

The first UE may comprise a transmitter. The first UE may comprise a control unit. The first UE may comprise a processor and a memory. The first UE may comprise a storage. The first UE may be communicatively coupleable to a remote storage.

It should be understood that the first UE may support V2X communication. For example, the first UE may be suitable for or included in a vehicle, infrastructure or a VRU device. In an example embodiment, the first UE comprises a V2X device. In an example embodiment, the first UE is a V2X device. V2X standard include: ETSI Cooperative Awareness Basic Service (EN 302 637-2); SAE J2735—Dedicated Short Range Communications (DSRC) Message Set Dictionary; and 3GPP TR 22.885 Study on LTE support for Vehicle to Everything (V2X) services. V2X communication includes vehicle-to-vehicle (V2V), vehicle-to-infrastructure (V2I), and vehicle-to-pedestrian (V2P) communication. For example, the first UE may be suitable for or included in a vehicle, infrastructure or a pedestrian device. In addition, V2X devices refer to any equipment able to transmit and/or receive V2X messages regardless of the underlying communication technology and independently of other functions that the V2X devices may have. The V2X devices may include, for example, devices fitted or retrofitted to vehicles, devices included in infrastructure such as traffic lights, traffic signs, road gantries and VRU devices such as smartwatches, smartphones, tablets, personal GPS navigation devices or wearable devices. In an example embodiment, the first UE comprises a V2X device. In an example embodiment, the first UE is a V2X device.

The first UE may be arranged to control the transmitter to transmit according to a broadcast protocol, for example communication protocols used in C-ITS (e.g. ETSI Cooperative Awareness Basic Service (EN 302 637-2); SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US). In an example embodiment, the first UE is arranged to control the transmitter to transmit according to a C-ITS communication protocol. In one example, the method complies with the On-Board System Requirements for V2V Safety Communications J2945/1_201603.

It should be understood that the transmitter may be a wireless transmitter. In an example embodiment, the transmitter comprises a wireless transmitter. In an example embodiment, the transmitter is a wireless transmitter. The first information may be transmitted using LTE-V2X or NR-V2X PC5 radio access technology. The first information may be broadcast by the first UE as a message or as part of a message, such as an ETSI Cooperative Awareness Basic Service (EN 302 637-2); SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US). In one example embodiment, the first UE is arranged to control the transmitter to transmit a message, wherein the message comprises the first information. In one example embodiment, the first UE is arranged to control the transmitter to periodically transmit a message, wherein the message comprises the first information. In one example embodiment, the first UE is arranged to control the transmitter to transmit a message in response to a request to transmit the message.

A periodicity of broadcasting and/or content, for example type or breadth, of the first information may be determined by at least one of a vehicle speed, proximity of other vehicles and/or road users, location, environment type, priority or request. For example, where the first UE is included in a vehicle, the first information may be broadcast below a predetermined speed of the vehicle, such as a typical average vehicle speed in congestion or city traffic. For example, where the first UE is included in a vehicle, the first information may be broadcast if other vehicles and/or road users are in the proximity of the vehicle, such as if other vehicles and/or road users are detected in a vicinity of the vehicle. For example, the first information may be broadcast if a vehicle V2X modem of the vehicle receives V2X signals from other neighbouring vehicles or similar information from other on-board sensors, for example RADAR, LIDAR or camera. For example, where the first UE is included in a vehicle, the first information may be broadcast according to a map based location and/or type of environment of the vehicle. Broadcasting may be time limited, for example while the first UE and the second UE are in mutual transmitting and/or receiving range. Additionally and/or alternatively, hysteresis may be present in a measured cell quantity domain to control the message broadcasting. Additionally and/or alternatively, broadcasting may be enabled only if a specific ITS service is running in the first UE and/or the second UE (e.g. the first vehicle and/or the second vehicle, respectively).

The first information may include additional information. For example, the first information may include an identifier of a cell(s) in which the first event was triggered, for example a downlink carrier frequency and/or a physical cell identifier. For example, the first information may include location information and/or identifier information of the first UE. For example, where the first UE is included in a vehicle, the first information may include safety critical or operational information, such as vehicle speed, vehicle location, vehicle acceleration, vehicle heading and/or physical vehicle parameters. Such safety critical or operational information may, for example, support C-ITS applications, avoid vehicle collisions, improve transport efficiency and/or comfort and/or support cooperative driving (i.e. vehicle platooning).

It should be understood that a typical communication range of DSRC depends on the application and/or the environment but may be up to 300-500 metres. In general, C-ITS applications may be designed to be technology agnostic and hence, the first environmental information may be transmitted via any supporting communication technology employed for V2X such as cellular Long Term Evolution (LTE) Device-to-Device and/or 5G.

The second UE may comprise a receiver. The second UE may comprise a control unit. The second UE may comprise a processor and a memory. The second UE may comprise a storage. The second UE may be communicatively coupleable to a remote storage.

It should be understood that the second UE may support V2X communication, as described previously. For example, the second UE may be suitable for or included in a vehicle, infrastructure or a VRU device. In an example embodiment, the second UE comprises a V2X device. In an example embodiment, the second UE is a V2X device.

The second UE may be arranged to control the receiver to receive according to communication protocols used in C-ITS. In an example embodiment, the second UE is arranged to control the receiver to receive according to a C-ITS communication protocol.

It should be understood that the receiver may be a wireless receiver. In an example embodiment, the receiver comprises a wireless receiver. In an example embodiment, the receiver is a wireless receiver. The first information may be received as a message or as part of a message, such as an ETSI Cooperative Awareness Basic Service (EN 302 637-2) messages; SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US).

CRM

The fifth aspect provides a tangible non-transient computer-readable storage medium having recorded thereon instructions which when implemented by a user equipment, UE, device, cause the UE device to perform a method of controlling a network, preferably a peer-to-peer network, the method according to the first aspect.

Method

The sixth aspect provides a method of controlling a network, for example a peer-to-peer network or a cellular network using a sidelink, SL, (also known as a PC5 interface) comprising a set of user equipment, UE, devices, including a first UE and a second UE, the method comprising:

determining, by the first UE, first information related to the network amongst a first set and corresponding second information related to the first UE amongst a second set;

transmitting, by the first UE, the first information and the corresponding second information;

receiving, by the second UE, the transmitted first information and the transmitted corresponding second information; and determining, by the second UE, a first state amongst a set of states of the network based on the transmitted first information and the transmitted corresponding second information, responsive to receiving the transmitted first information and the transmitted corresponding second information.

In this way, the second UE (i.e. a sink or a target) determines the first state of the network, responsive to the received first information (for example, frequency, physical cell identifier, received signal power e.g. RSRP, RSSI or quality e.g. RSRQ) and the corresponding second information (for example, location) from the first UE (i.e. a source). By determining the first state of the network, the second UE may anticipate or predict changes to a state of the network. In response to an anticipated or predicted change to the state of the network, the second UE may initiate an action, for example a first action as described previously, thereby maintaining and/or enhancing safety, for example, even if a quality of service (QoS) is degraded. That is, the first UE and the second UE operate cooperatively. That is changes to the QoS are mitigated, so as to ensure, maintain and/or enhance safety, for example in C-ITS using V2X communication.

Particularly, the inventors have determined that by anticipating or predicting changes to QoS, safety applications for example C-ITS applications may be better supported, thereby enhancing safety. For example, by adjusting V2X applications in advance of changes in QoS, reliability, performance and/or continuity of a function of the second UE may be increased.

For example, where the first UE is included in a first vehicle and the second UE is included in a second vehicle, the first UE may determine and transmit network information such as frequency, physical cell identifier, RSSI, RSRP and/or RSRQ (i.e. the first information) with corresponding locations thereof (i.e. the second information). Upon receiving the first information and the corresponding second information, the second UE determines the first state of the network, for example at the corresponding location of the first UE, and may predict (i.e. calculate) similar first information therefrom for a future location of the second UE, such as proximal or at the locations included in the received second information. If the first state of the network, for example at the corresponding location of the first UE, is changed compared with a current state of the network, for example at a current location of the second UE, the second UE may initiate a first action, as described above, to mitigate for the change. For example, if the RSSI, RSRP and/or RSRQ at the corresponding location of the first UE is degraded compared with the RSSI, RSRP and/or RSRQ at the current location of the second UE, the second UE may reduce a bitrate usage thereof, as described previously.

The method, the network, the set of UE devices, the first UE, the second UE and/or the first information may be as described with respect to the first aspect. Particularly, the method of the sixth aspect may include all the steps and/or features of the method of the first aspect and vice versa.

The first UE determines the first information related to the network amongst the first set. In one example, the first set comprises more than 1 first information, for example 2, 3, 4, 5, 6, 7, 8, 9, 10 or more first information. In one example, the first set comprises J first information where J is a natural number greater than 0. Each of the first information of the set may be as described with respect to the first information.

In one example, the first information comprises a cell frequency and/or a cell identifier, and/or a radio signal parameter, for example a Reference Signal Strength Indicator, RSSI, Reference Signal Received Power, RSRP, a Reference Signal Received Quality, RSRQ, Channel Busy Ratio, a latency, a bitrate and/or a data buffer occupancy rate and/or a detector signal, for example provided by an imaging detector, a RADAR detector and/or a LIDAR detector. Additionally and/or alternatively, the first information may comprise sidelink reference signal received power (S-RSRP), sidelink discovery reference signal received power (SD-RSRP); PSSCH reference signal received power (PSSCH-RSRP) and/or sidelink reference signal strength indicator (S-RSSI).

In one example, the first set comprises n values for n locations (i.e. for the respective n values of the second set):
Cell Measurement$_1$ (frequency$_1$, physical cell identifier$_1$, RSRP$_1$, RSRQ$_1$);
Cell Measurement$_2$ (frequency$_2$, physical cell identifier$_2$, RSRP$_2$, RSRQ$_2$);
Cell Measurement$_3$ (frequency$_3$, physical cell identifier$_3$, RSRP$_3$, RSRQ$_3$);
Cell Measurement$_4$ (frequency$_4$, physical cell identifier$_4$, RSRP$_4$, RSRQ$_4$); . . .
Cell Measurement$_n$ (frequency$_n$, physical cell identifier$_n$, RSRP$_n$, RSRQ$_n$).

The first UE determines the corresponding second information related to the first UE amongst a second set. It should be understood that the second information corresponds with the first information, for example temporally (by time such as the same time) and/or spatially (by location such as the same location). In one example, the second set comprises more than 1 second information, for example 2, 3, 4, 5, 6, 7, 8, 9, 10 or more second information. In one example, the second set comprises K second information where K is a natural number greater than 0. Each of the second information of the set may be as described with respect to the second information. In one example, the second information comprises data related to the first UE, for example a type, a speed, a location (also known as position), an acceleration, a heading or a bearing and/or a lane. In one example, a type includes a station type, for example car, truck, cyclist, pedestrian, infrastructure. Additionally and/or alternatively, in one example, a type includes a number of antennas, a position in and/or on a vehicle, supported frequency or supported frequencies and/or receiver sensitivity. In one example, the first UE determines the corresponding second information by accessing the corresponding second information from a storage and/or a processor, for example from a first vehicle via an on-board diagnostic (OBD) interface or port. In one example, the first UE determines the corresponding second information by measurement thereof.

In one example, the second information related to the first UE is location of the first UE, given for example by latitude (lat), longitude (long) and/or altitude (also known as elevation) thereof, as determined by GPRS, for example. That is, the location is a geographic location. In one example, the second set comprises n values for n locations P:
$P_1$ (lat$_1$, long$_1$);
$P_2$ (lat$_2$, long$_2$);
$P_3$ (lat$_3$, long$_3$);
$P_4$ (lat$_4$, long$_4$); . . .
$P_n$ (lat$_n$, long$_n$).

In one example, the first information and the corresponding second information are provided as n value pairs:
$P_1$ (lat$_1$, long$_1$), Cell Measurement$_1$ (frequency$_1$, physical cell identifier$_1$, RSRP$_1$, RSRQ$_1$);
$P_2$ (lat$_2$, long$_2$), Cell Measurement$_2$ (frequency$_2$, physical cell identifier$_2$, RSRP$_2$, RSRQ$_2$);
$P_3$ (lat$_3$, long$_3$), Cell Measurement$_3$ (frequency$_3$, physical cell identifier$_3$, RSRP$_3$, RSRQ$_3$);
$P_4$ (lat$_4$, long$_4$); Cell Measurement$_4$ (frequency$_4$, physical cell identifier$_4$, RSRP$_4$, RSRQ$_4$); . . .
$P_n$ (lat$_n$, long$_n$), Cell Measurement$_n$ (frequency$_n$, physical cell identifier$_n$, RSRP$_n$, RSRQ$_n$).

In one example, the first set is included in a pathHistory Data Frame of a LF Container (BasicVehicleContainerLowFrequency), as described below in more detail.

In one example, the second set is included in a pathHistory Data Frame of a LF Container (BasicVehicleContainerLowFrequency), as described below in more detail.

In one example, the first set and the second set are included, for example together, as pairs ad/or as mapped values, in a pathHistory Data Frame of a LF Container (BasicVehicleContainerLowFrequency), as described below in more detail.

In one example, the first set has a fixed size J, as described above and the first set is filled to include J first information. Addition of another first information to the first set comprises removal of the earliest added first information and subsequent addition of another first information i.e., first in, first out. In one example, the first set is an ordered first set, for example ordered by time and/or location. In one example, the first set provides a history of the first information, for example by time and/or location. The second set may be similar to the first set, mutatis mutandis.

The first UE transmits the first information and the corresponding second information, as described previously with respect to the first aspect mutatis mutandis.

The second UE receives the transmitted first information and the transmitted corresponding second information, as described previously with respect to the first aspect mutatis mutandis.

The second UE determines the first state amongst the set of states of the network based on the transmitted first information and the transmitted corresponding second information, responsive to receiving the transmitted first information and the transmitted corresponding second information. It should be understood that a state of the network is based on, comprises and/or is the first information for the corresponding second information. For example, if the first information comprises RSRP and the corresponding second information comprises location, then the state of the network may be the RSRP at the corresponding location, as determined by the first UE. In this way, the second UE may predict the RSRP in advance of arriving at that corresponding location, for example. In one example, the second UE is arranged to determine a current state of the network and compare the current state of the network with the first state. In one example, the first UE is arranged to predict signal coverage change from the first state, the set of states and/or the current state, for example by comparing such as calculating a difference therebetween (i.e. a result of the comparing). Optionally, the second UE may initiate an action, as described herein in more detail, responsive to determining the first state and/or a result of comparing the current state of the network with the first state.

In one example, the second UE is arranged to receive first information and corresponding second information transmitted by a plurality of first UEs. In this way, the second UE may determine a map, mesh, grid, array and/or list for example, of states of the network based thereon and/or more reliably determine a state, for example at a particular location. Since the second UE may receive such first and second information intermittently, frequently and/or periodically from one or more first UEs, the second UE may determine updated states, for example dynamically, so as to improve prediction of the network for a path to be taken by the second UE.

To predict mobile network signal coverage change by vehicles surrounding a host vehicle (HV) measured, for example, on C-V2X Uu interface of the HV, new information (i.e. first information) related to the measured mobile network cell signal identifier, power and quality (e.g. for LTE: cell frequency, physical cell identifier, RSRP and RSRQ) may be included with every PathPoint in the pathHistory of HV CAM/BSM broadcasted messages, for example. By tracking the RSRP and RSRQ measurements along with the position in the pathHistory, the receiving vehicle (i.e. the second UE) would be able to track (predict) mobile network signal coverage changes from the vehicle(s) in front of him (travelling both in the same or the opposite directions).

The particularly novel part in this approach includes combining mobile cell measurements tracking performed by the cellular modem (i.e. the first UE, for example in included in a first vehicle) with vehicle location tracking to predict signal coverage change (i.e. by the second UE, for example included in a second vehicle).

It should be understood that steps and features of the first aspect may be combined with steps and features of the fifth aspect, without limitation.

In one example, the method comprises:
measuring, by the first UE, a first parameter amongst a set of parameters;
optionally, comparing the measured first parameter with a first threshold parameter amongst a corresponding set of threshold parameters and/or a measured second parameter; and
including, by the first UE, the measured first parameter in the first information.

In one example, the method comprises:
measuring, by the first UE, a second parameter amongst a second set of parameters; and
including, by the first UE, the measured second parameter in the first information.

In one example, the first parameter comprises a radio reception performance parameter, for example a Channel Busy Ratio; a cell parameter, for example a cell frequency and/or a cell identifier; and/or a radio signal parameter, for example a Reference Signal Strength Indicator, RSSI, a Reference Signal Received Power, RSRP, a Reference Signal Received Quality, RSRQ, Channel Busy Ratio, a latency, a bitrate and/or a data buffer occupancy rate and/or a detector signal, for example provided by an imaging detector, a RADAR detector and/or a LIDAR detector. By including a radio reception performance related parameter, the second UE may predict radio reception performance, for example.

In one example, the transmitting, by the first UE, the first information related to the identified first event comprises broadcasting and/or multicasting, by the first UE, the first information related to the identified first event.

In one example, the determining, by the second UE, the set of states of the network based on the transmitted first information and the transmitted corresponding second information comprises mapping a radio signal parameter, for example a Reference Signal Strength Indicator, RSSI, a Reference Signal Received Power, RSRP, a Reference Signal Received Quality, RSRQ, Channel Busy Ratio, included in the first information using a corresponding location of the first UE included in the second information.

In one example, the method comprises calculating, by the second UE, a predicted state of the network corresponding to a predicted location of the second UE, using the set of states of the network. In this way, the second UE may determine the predicted state of the network, for example dynamically, for a path to be taken by the second UE.

In one example, the method comprises initiating a first action amongst a set of actions, based on the predicted state of the network. The first action may be as described with respect to the actions according to the first aspect.

In one example, the first UE is included in and/or comprises a first vehicle and wherein the second UE is included and/or comprises in a second vehicle.

In one example, the initiating, by the second UE, the first action comprises modifying a speed, a location, an acceleration, a heading or a bearing, a lane and/or a spacing thereof.

In one example, the initiating, by the second UE, the first action comprises modifying an autonomy level of the second vehicle and/or alerting an occupant of the second vehicle.

In one example, the initiating, by the second UE, the first action comprises neighbour cell measurements and/or cell reselection or cell handover.

In one example, the transmitting, by the first UE, the first information and/or the second information comprises establishing a connection between the first UE and the second UE.

In one example, the method comprises:
identifying, by the first UE, a first, preferably preconfigured, event amongst a set of events;
transmitting, by the first UE, the first information related to the identified first event; and
initiating, by the second UE, a first action amongst a set of actions, responsive to the received first information.

In one example, the first event is a preconfigured first event, wherein the method comprises preconfiguring the first event by, for example, the network, the second UE and/or a manufacturer of the first UE.

In one example, the method comprises:
measuring, by the first UE, a first parameter amongst a set of parameters;
comparing the measured first parameter with a first threshold parameter amongst a corresponding set of threshold parameters and/or a measured second parameter; and
wherein the first information comprises a first identifier of the first event amongst a corresponding set of identifiers.

In one example, the first action comprises a safety action; and
wherein initiating, by the second UE, the first action comprises invoking a safety application, for example a Cooperative Intelligent Transport Systems, C-ITS, application and/or an Advanced Driver-Assistance Systems, ADAS, application.

In one example, initiating, by the second UE, the first action comprises modifying a bitrate usage of the second UE.

Network

The seventh aspect provides a network, for example a peer-to-peer network or a cellular network, comprising a set of user equipment, UE, devices, including a first UE and a second UE;
wherein the first UE is arranged to:
determine first information related to the network and corresponding second information related to the first UE; and
transmit the first information and the corresponding second information;
wherein the second UE is arranged to:
receive the transmitted first information and the transmitted corresponding second information; and
determine a first state amongst a set of states of the network based on the transmitted first information and the transmitted corresponding second information, responsive to receiving the transmitted first information and the transmitted corresponding second information.

The network, the set of UE devices, the first UE, the second UE and/or the first information may be as described with respect to the second aspect. Particularly, the network of the seventh aspect may include some or all of the features of the network of the second aspect and vice versa. The network, the first UE and/or the second UE may implement any method or step thereof described with respect to the sixth aspect and optionally, the first aspect.

UE Devices

The eighth aspect provides a user equipment, UE, device arranged to:
determine first information related to a network and corresponding second information related to the UE; and
transmit the first information and the corresponding second information.

The network, the UE and/or the first information may be as described with respect to the third aspect. Particularly, the UE of the eighth aspect may include some or all the features of the UE of the third aspect and vice versa. The network, the first UE and/or the second UE may implement any method or step thereof described with respect to the sixth aspect and optionally, the first aspect and/or the ninth aspect.

The ninth aspect provides user equipment, UE, device arranged to:
receive first information related to a network and corresponding second information related to another UE; and
determine a first state amongst a set of states of the network based on the transmitted first information and the transmitted corresponding second information, responsive to receiving the transmitted first information and the transmitted corresponding second information.

The network, the UE and/or the first information may be as described with respect to the fourth aspect. Particularly, the UE of the ninth aspect may include some or all the features of the UE of the fourth aspect and vice versa. The network, the first UE and/or the second UE may implement any method or step thereof described with respect to the sixth aspect and optionally, the first aspect and/or the eighth aspect.

The tenth aspect provides a tangible non-transient computer-readable storage medium having recorded thereon instructions which when implemented by a user equipment, UE, device, cause the UE device to perform a method of controlling a network, preferably a peer-to-peer network, the method according to the sixth aspect and optionally the first aspect.

General Definitions

Throughout this specification, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

FIG. 1 schematically depicts a method of controlling a network, for example a peer-to-peer network or a cellular C-V2X network using a sidelink, SL, according to an exemplary embodiment of the invention.

Particularly, the method is of controlling a network, for example a peer-to-peer network or a cellular C-V2X network using a sidelink, SL, comprising a set of user equipment, UE, devices, including a first UE and a second UE.

At S101, the first UE determines first information related to the network amongst a first set and corresponding second information related to the first UE amongst a second set.

At S102, the first UE transmits the first information and the corresponding second information.

At S103, the second UE receives the transmitted first information and the transmitted corresponding second information.

At S104, the second UE determines a first state amongst a set of states of the network based on the transmitted first information and the transmitted corresponding second information, responsive to receiving the transmitted first information and the transmitted corresponding second information.

The method may include any of the steps described herein with reference to the sixth aspect.

Figure 2:
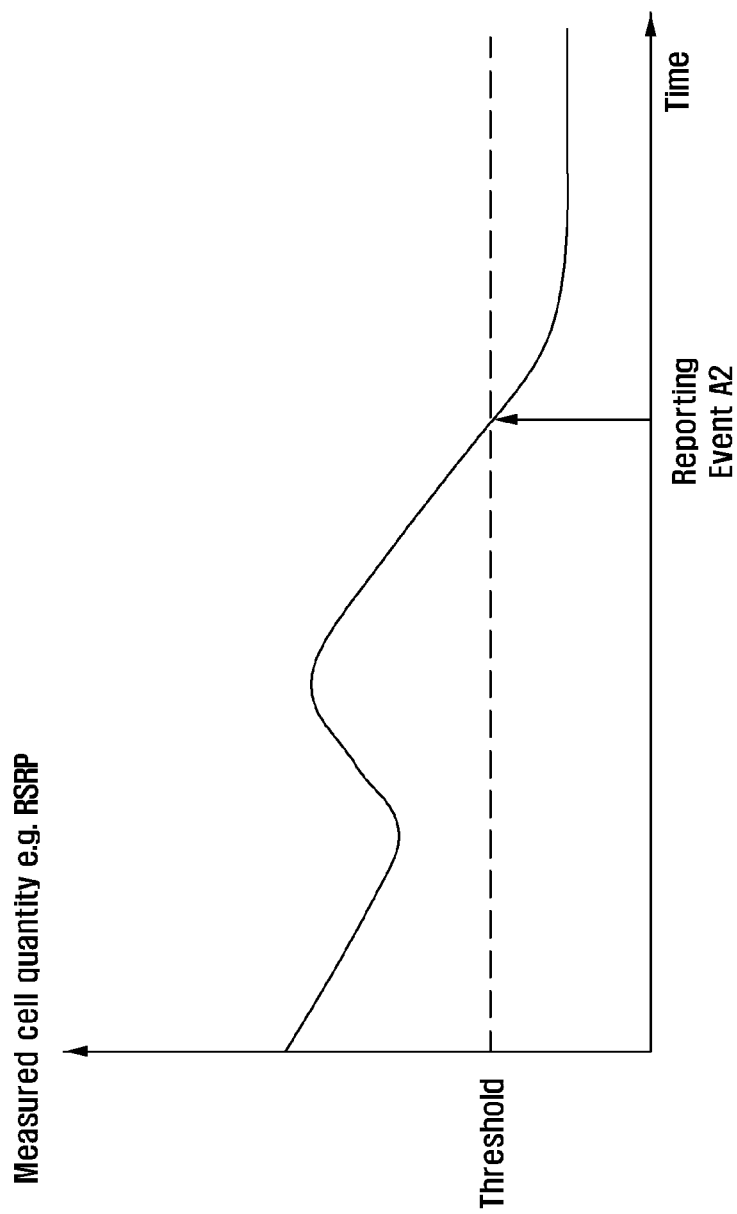
FIG. 2 schematically depicts a first event.

FIG. 2 schematically depicts a first event.

Particularly, FIG. 2 shows a graph of a measured cell quantity (i.e. a first parameter), for example RSRP, as a function of time. A corresponding threshold parameter is shown. When the first parameter decreases below the threshold parameter, reporting event A2 (serving cell becomes worse than predefined threshold) is triggered.

Figure 3:
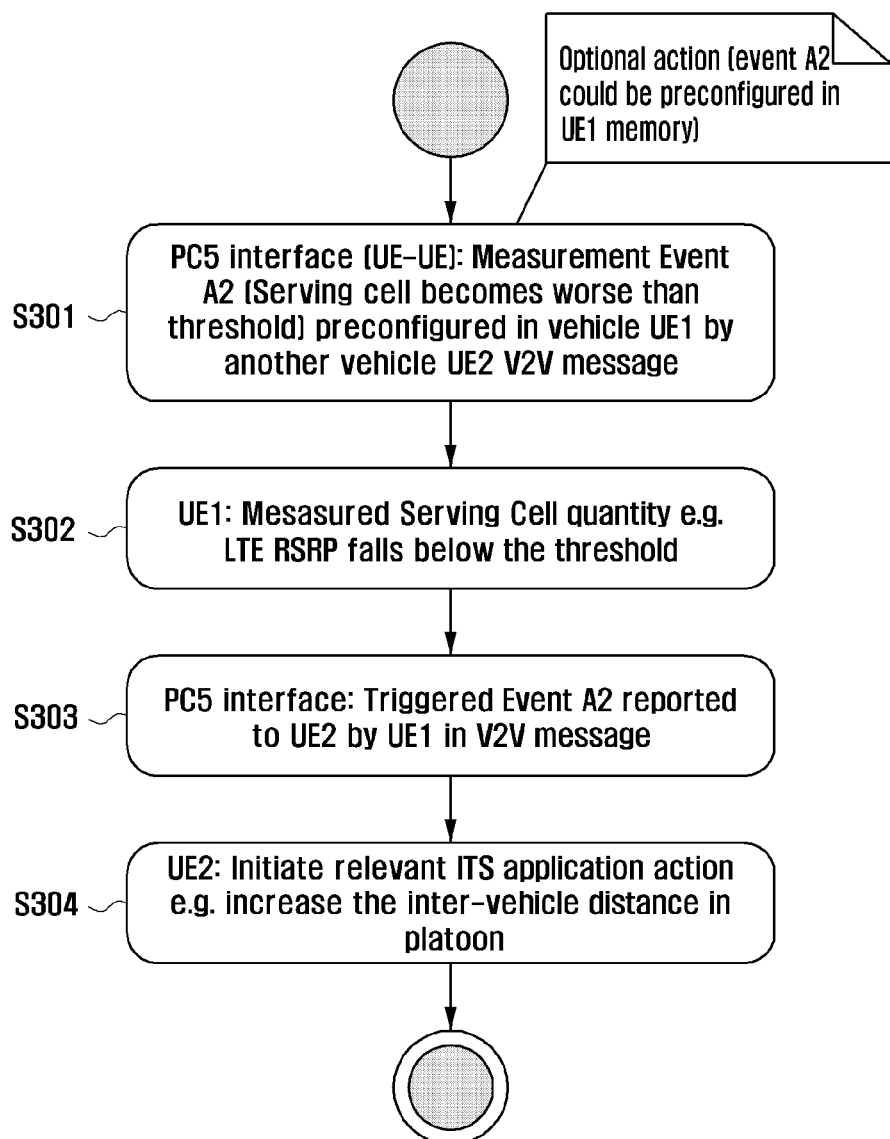
FIG. 3 schematically depicts a method of controlling a network according to an exemplary embodiment of the invention, in more detail.

FIG. 3 schematically depicts a method of controlling a peer-to-peer network according to an exemplary embodiment, in more detail. Particularly, FIG. 3 shows a flowchart of the method implemented according to a V2X implementation.

At S301, a first, preferably preconfigured, event, in this example a measurement event A2 (Serving cell becomes worse than threshold) is preconfigured in a first UE included in a first vehicle by a second UE included in a second vehicle, via a PC5 interface (UE to UE). Alternatively, the measurement event A2 may be preconfigured in the first UE, for example in a memory thereof. Alternatively, the measurement event A2 may be preconfigured in the first UE by the mobile network via a Uu interface. The first event is the identified first event amongst a set of events.

At S302, the first UE measures a first parameter, in this example a LTE RSRP, amongst a set of parameters. The first UE compares the measured first parameter with a first threshold parameter amongst a corresponding set of threshold parameters. The measured first parameter is below the first threshold, thereby triggering transmitting of first information comprising a first identifier (i.e. A2) of the first event amongst a corresponding set of identifiers.

At S303, the triggered event is reported to the second UE by the first UE in a V2V message via the PC5 interface. That is, the first UE transmits first information (i.e. A2) related to the identified first event with physical cell identification (i.e. downlink carrier frequency, physical cell id).

At S304, the second UE receives the transmitted first information (i.e. A2) and the second UE initiates a first action amongst a set of actions, responsive to the received first information if the second UE uses the same cell(s). In this example, the first action comprises a safety action; and initiating, by the second UE, the first action comprises invoking a C-ITS application and dynamically modifying a gap between platoon vehicles including the second UE.

The method may include any of the steps described herein with reference to the first aspect.

Figure 4:
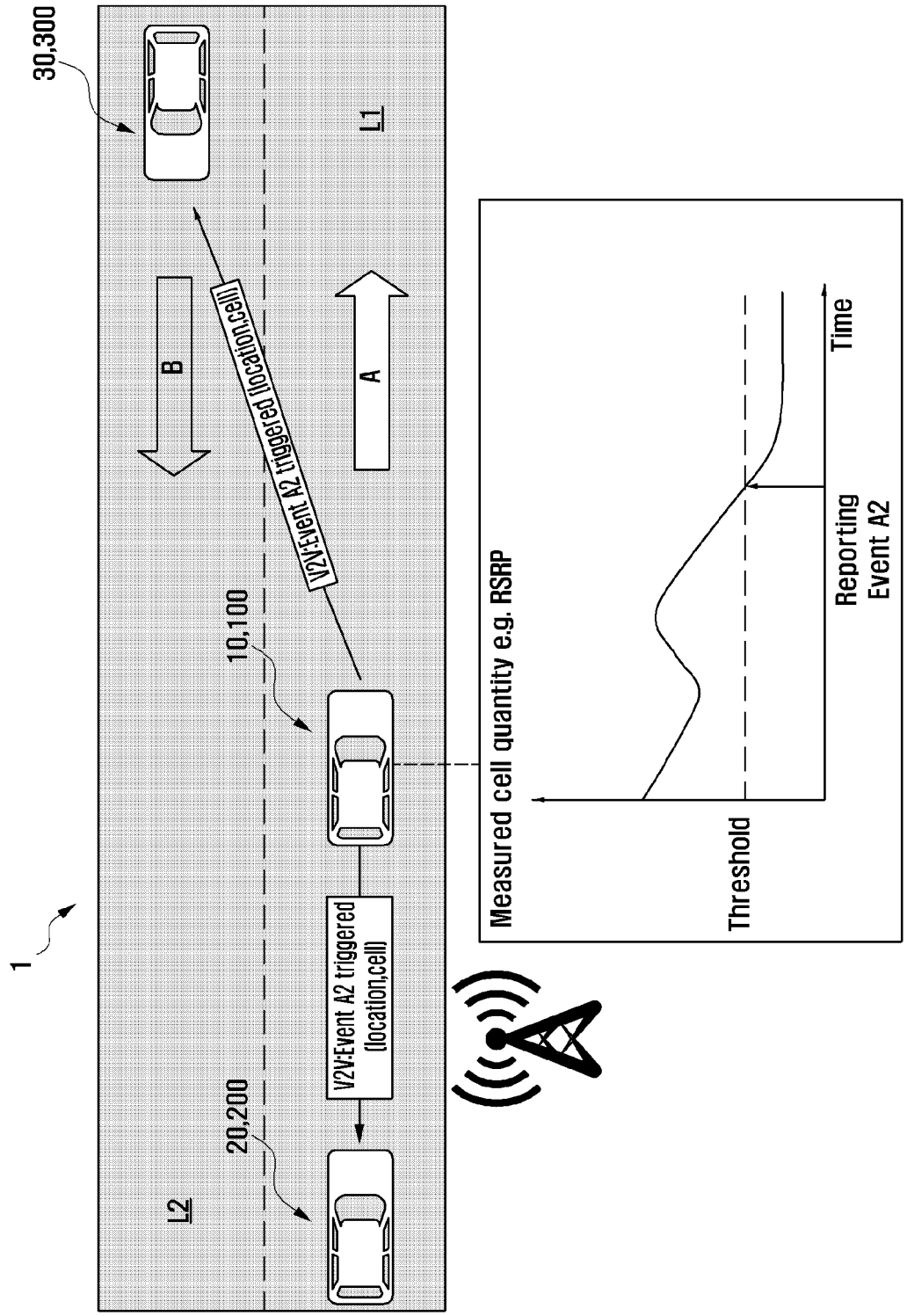
FIG. 4 schematically depicts a network according to an exemplary embodiment of the invention, in use.

FIG. 4 schematically depicts a peer-to-peer network 1 according to an exemplary embodiment of the invention, in use.

The peer-to-peer network 1 comprises a set of user equipment, UE, devices, including a first UE 100 and a second UE 200. The first UE 100 is arranged to identify a first event amongst a set of events and transmit first information related to the identified first event. The second UE 200 is arranged to receive the transmitted first information and initiate a first action amongst a set of actions, responsive to the received first information. The first UE 100 is included in a first vehicle 10 and the second UE is included in a second vehicle 20. The first vehicle 10 and the second vehicle 20 are moving in a direction A in a first lane L1. The first vehicle 10 is ahead of the second vehicle 20. A third vehicle 30, including a third UE 300 of the set of UE devices, is moving in a direction B, opposed to the direction A, in a second lane L2, adjacent to the first lane L1.

Particularly, FIG. 4 shows an example of 'serving cell lost' prediction use case based on an Event A2 ('Serving cell becomes worse than threshold') broadcast in a V2X message, as described above with reference to FIG. 2. The first vehicle 10 (i.e. the first UE 100 included in this source vehicle) transmits the first information related to the Event A2, which is received by the second vehicle 20 (i.e. the second UE 200 included in this sink vehicle). It should be noted that in the receiving vehicle 30 (i.e. the third UE included in this sink vehicle) travelling in the opposite direction to the source vehicle 10, the measured radio signal quantity change is inversed and as a result event A2 is interpreted as event A1 'Serving cell becomes better than threshold'. This event A1 information could be leveraged to predict upcoming cell change and report it to the network (in a separate UE Measurement Report message) to allow the network to trigger handover earlier. The same applies for a cell reselection autonomously triggered by the UE. This approach may improve the performance of UE mobility procedures (e.g. less dropped calls) in the mobile network (both cell handover and reselection) by allowing more time to prepare for them e.g. triggering additional handover target cell measurements (may require radio resource reconfiguration to allow those measurements i.e. by reducing data rate during transmission to create so called 'measurement gaps'). Due to high velocities expected in UE vehicles, it may be important to identify the need for an inter-cell mobility faster to decrease unsuccessful handovers, dropped data connections and improve the user experience etc. As a result, vehicles 20, 30 travelling in both directions may benefit from receiving this triggered event information to predict QoS changes and inform corresponding ADAS application and also improve vehicle UE mobility performance in the mobile network.

Figure 5:
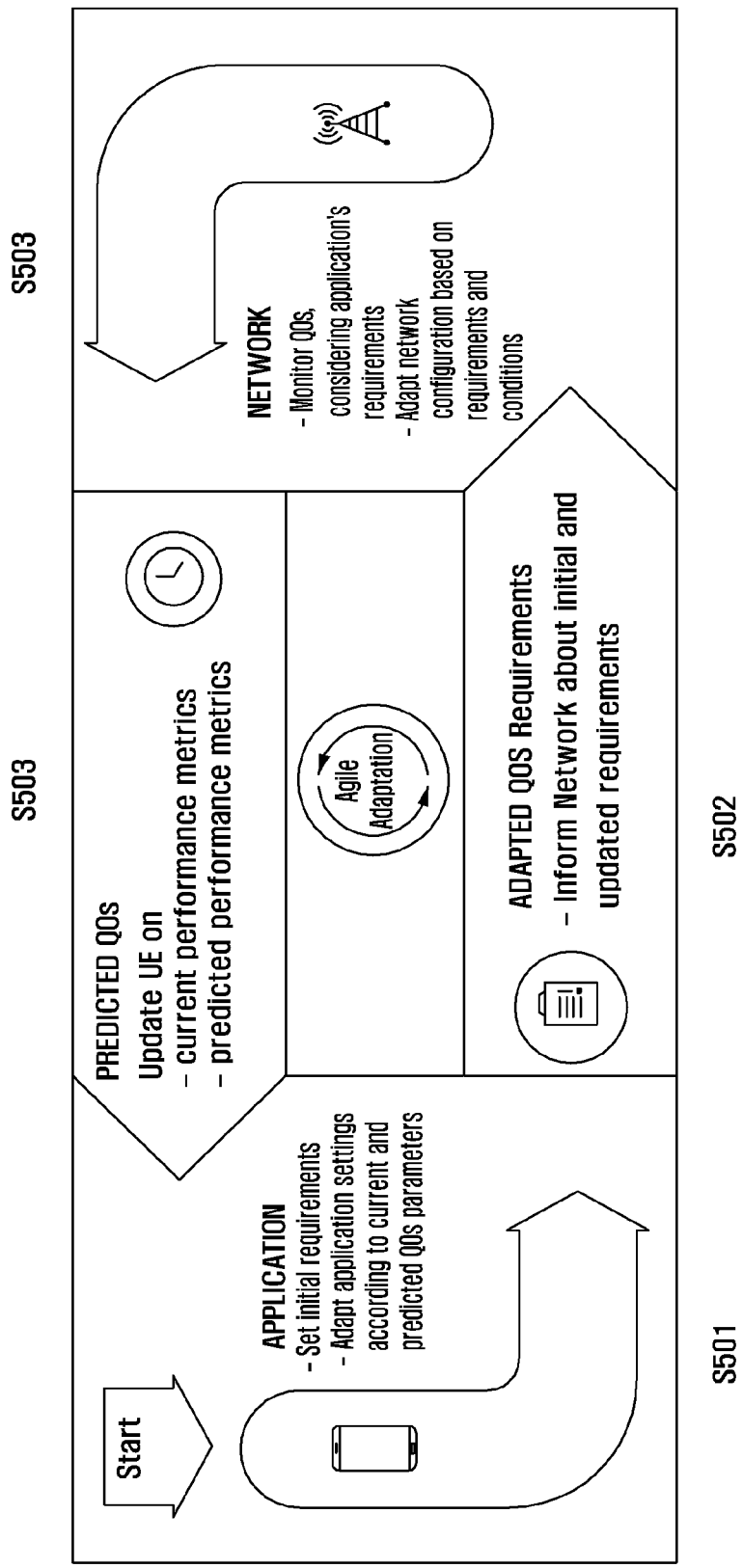
FIG. 5 schematically depicts a depicts a method of controlling a network according to an exemplary embodiment of the invention.

FIG. 5 schematically depicts a method of controlling a network according to an exemplary embodiment of the invention.

Particularly, FIG. 5 shows an example of how QoS prediction may be used by an in-vehicle C-ITS application. As an example, the prediction allows a platooning control application to dynamically modify a gap between platoon vehicles depending on the QoS service (e.g. end to end communication latency) provided by the network (i.e. the higher QoS the network can provide, the shorter distance among the vehicles that form the platoon may be).

At S501, initial requirements of an application are set in a first UE and application settings are adapted according to current and predicted QoS parameters.

At S502, the network is informed about the initial and the updated requirements, such that QoS requirements are adapted.

At S503, the network monitors QoS, considering the application's requirements, and the network configuration is adapted based on requirements and conditions.

At S504, the first UE is updated on current performance metrics and predicted performance metrics (i.e. current and predicted QoS, respectively).

Optionally, the method repeats, though initial requirements of the application may not be reset during the repeated steps.

The method may include any of the steps described herein with reference to the first aspect.

Figure 6:
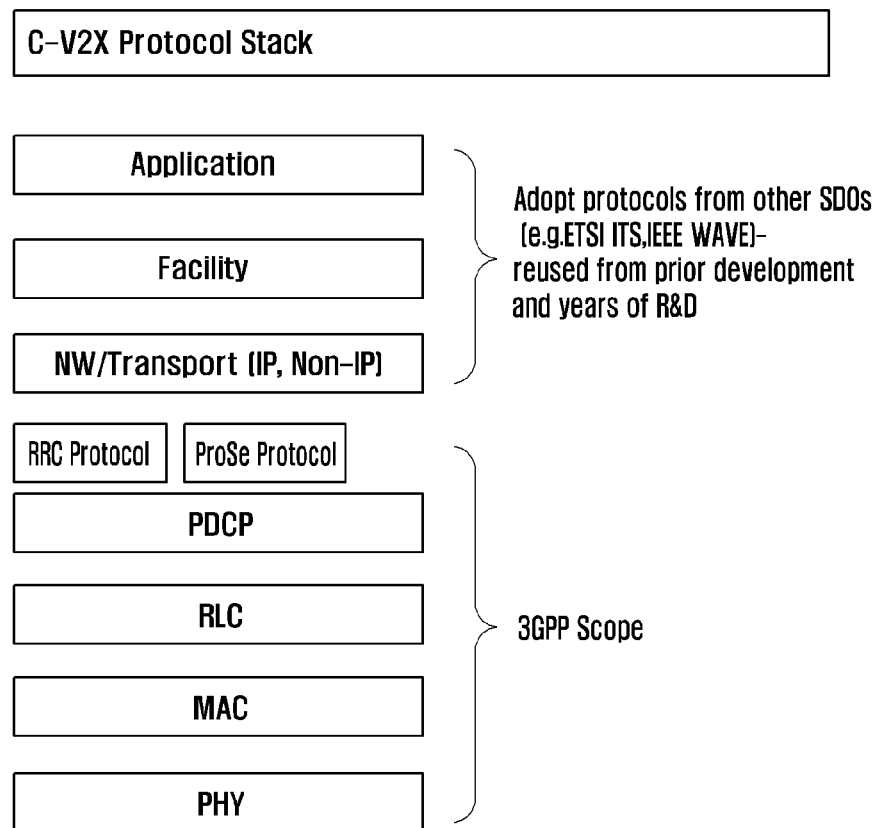
FIG. 6 schematically depicts a C-V2X protocol stack.

FIG. 6 schematically depicts a C-V2X protocol stack.

In more detail, in C-V2X in parallel to Uu interface, a sidelink (PC5) interface is available for direct vehicle UE to UE communication. To allow advance notification (prediction) of mobile network coverage change in vehicle UE, the RRC protocol cell measurement reporting mechanism may be extended to the sidelink PC5 interface used in C-V2X direct communications between vehicles. As a result, existing measurements events (defined to the measured serving cell or neighbour cells quantities) may be used to preconfigure, trigger and report observed mobile radio signal coverage changes by the vehicle to the locally surrounding vehicles. There may be also some new type of events defined specific for PC5 interface and more suitable for C-ITS applications.

Measurement events triggering in the vehicle UE may be preconfigured by:
1. The mobile NW (as in legacy RRC) on Uu interface i.e. by usage of broadcasted system information mechanism in a cell or UE dedicated signalling.
2. Other vehicle(s) on PC5 interface. This may require bidirectional coordination between communicating V2X devices and extension of the existing RRC measurement configuration and reporting procedure to sidelink. As a variant of this approach, a client-server architecture with an event subscription based mechanism could be used e.g. the event reporting vehicle is a server and receiving vehicles are clients subscribing to the information on specific event being triggered in the server.
3. A road side (infrastructure) unit—static element enabling communication for road infrastructure elements e.g. traffic lights, gantries etc.
4. Other means—local SIM card memory or dedicated server infrastructure owned by the vehicle manufacturer or mobile network operator.

Triggered measurement event information may be transmitted to surrounding vehicles in:
1. In the C-V2X radio access protocol stack. Particularly, Radio Resource Control layer messages may be extended to PC5 interface e.g. similar message to the existing RRC MeasurementReport message may be defined on sidelink. Because RRC protocol currently does not support operation vehicle information (location, speed, heading), the information about a triggered radio coverage event would need to be combined with this information typically available in higher protocol layers.
2. Above the C-V2X radio access protocol stack, for example, by extending the Application or Facility layer, protocol messages (e.g. V2V CAM (EU) or BSM (US)) or by creating new types of message specific for measurement reporting on PC5 interface. The advantage of this approach is the fact that CAM and BSM messages already include operational vehicle information (e.g. vehicle type, speed, location, acceleration, heading, physical vehicle parameters) to support C-ITS applications.

To allow sharing and combing the information about radio coverage changes with operational vehicle information, some cross layer information exchange would be required (e.g. via API programming interface). In the receiving V2X system, triggered measurement event information combined with source vehicle location and moving direction (this information is already available in V2V CAM (EU) or BSM (US) messages) enables receiving vehicles predict network coverage changes.

Figure 7:
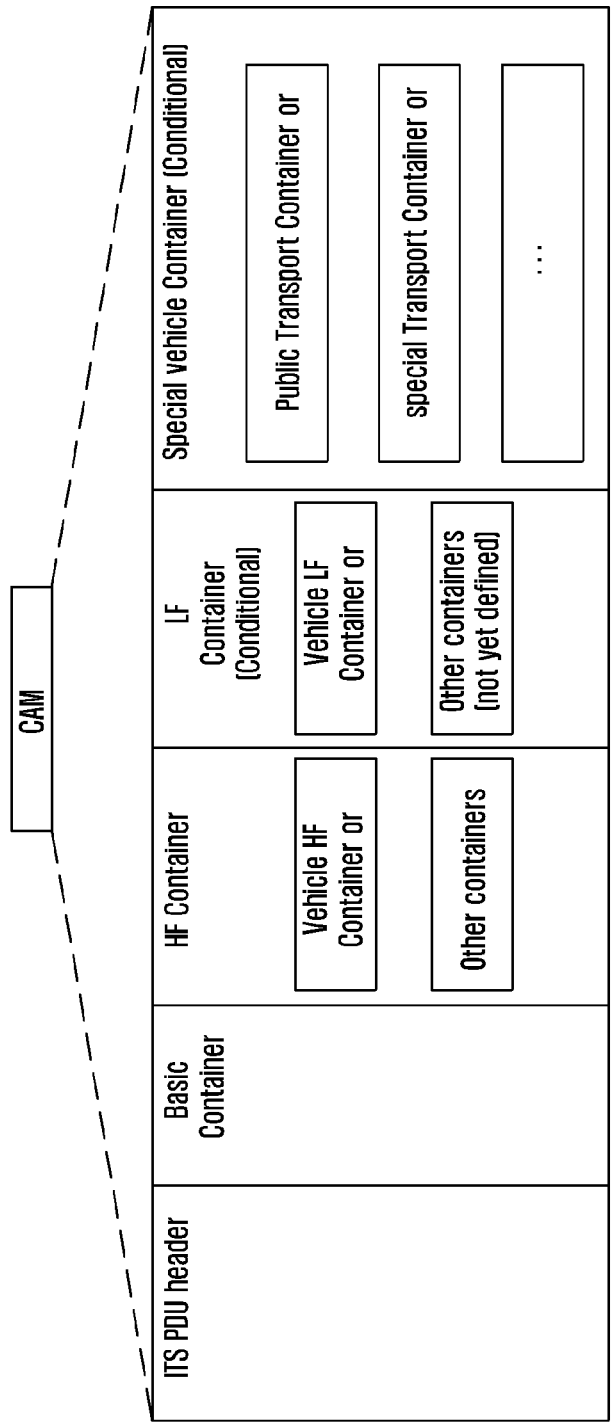
FIG. 7 schematically depicts a Cooperative Awareness Message (CAM) structure.

FIG. 7 schematically depicts a Cooperative Awareness Message (CAM) structure.

Particularly, FIG. 7 shows a general CAM structure. CAM data elements and size are described in Table 3. The vehicle High Frequency (HF) container contains fast-changing status information such as heading or speed. The Low Frequency (LF) container contains static or slow-changing vehicle data like exterior lights status and path history.

TABLE 3

CAM Data Elements and sizes

| Data Elements | Type | Typical Size (Bytes) | Description |
| --- | --- | --- | --- |
| ITS PDU Header | Mandatory | 8 | Protocol version, message type, sender address, and time stamp |
| Basic Container | Mandatory | 18 | Station type (e.g. lighttruck, cyclist pedestrians, etc.) and position |
| High-Frequency (HF) Container | Mandatory | 23 | All fast-changing status information of the vehicle, i.e., heading, speed.. acceleration, etc. |
| Low-Frequency (LF) Container | Mandatory (every 500 ms) | 60 (7 path history points) | Static or slow-changing, vehicle data, mainly path history. The path history is made up of a number of path history points. Typically 7 path history points are sufficient to cover over 90% cases based on extensive testing whereas up to 23 path history points can be contained. Each point is approximately 8 bytes [1]. |

TABLE 3-continued

CAM Data Elements and sizes

| Data Elements | Type | Typical Size (Bytes) | Description |
| --- | --- | --- | --- |
| Special Vehicle Container | Optional | 2-11 | Specific vehicles role in road traffic (e.g. public transport vehicles realizing a rescuing operation, etc.) |

FIG. 8 schematically depicts ASN.1 definitions.

Particularly, FIG. 8 shows detailed LF Container Abstract Syntax Notation (ASN) 1. The LF Container (BasicVehicle-ConitainerLowFrequency) includes a Data Frame (DF) pathHistory PathHistory.

he pathHistory Data Frame (collection of Data Elements) is described in Table 4. ETSI ITS standard defines position path history with up to 23 path history points, as included in the pathHistory Data Frame

TABLE 4 pathHistory Data Frame

| | |
| --- | --- |
| Description | This DF represents the vehicle's recent movement over some past time and or distance. It consists of a list of path points, each represented as DF PathPoint. The list of path points may consist of up to 23 elements. The generation of each pathPoint shall be done as specified in SAE 32735. |
| Data setting and presentation requirements | The PathPoint closest to the current position of originating ITS-S shall be put as the first point; it represents an offset delta position with regards to the referencePosition. Otjer PathPoints shall be structured in ascending order according to the distance to the referencePosition along the path. Each PathPoint represents an offset delta position with regards to the previous PathPoint. For CAM the DE PathDeltaTime shall present the time difference when two consecutive PathPoint values are measured. The DF shall be presented as specified in ETSI TS 102 894-2 PathHistory. |

SAE standard J2735 in the US uses similar vehicle path history mechanism in Vehicle Safety Extension part of the Basic Safety Message. The history could include up to 15 points (i.e. locations).

The Path History (PH) module for the V2V communications System uses a history of the past Global Navigation Satellite System (GNSS) locations traversed by the Host Vehicle (HV) (i.e. the first vehicle 10 including the first UE 100') and computes a PH representation of recent vehicle movement over a certain distance. The PH communicated by a vehicle provides other vehicles with information needed for predicting the roadway geometry. It plays an important role in target vehicle classification, relative to the HV (e.g. in ADAS), with reference to the roadway as presented in FIG. 9.

Figure 9:
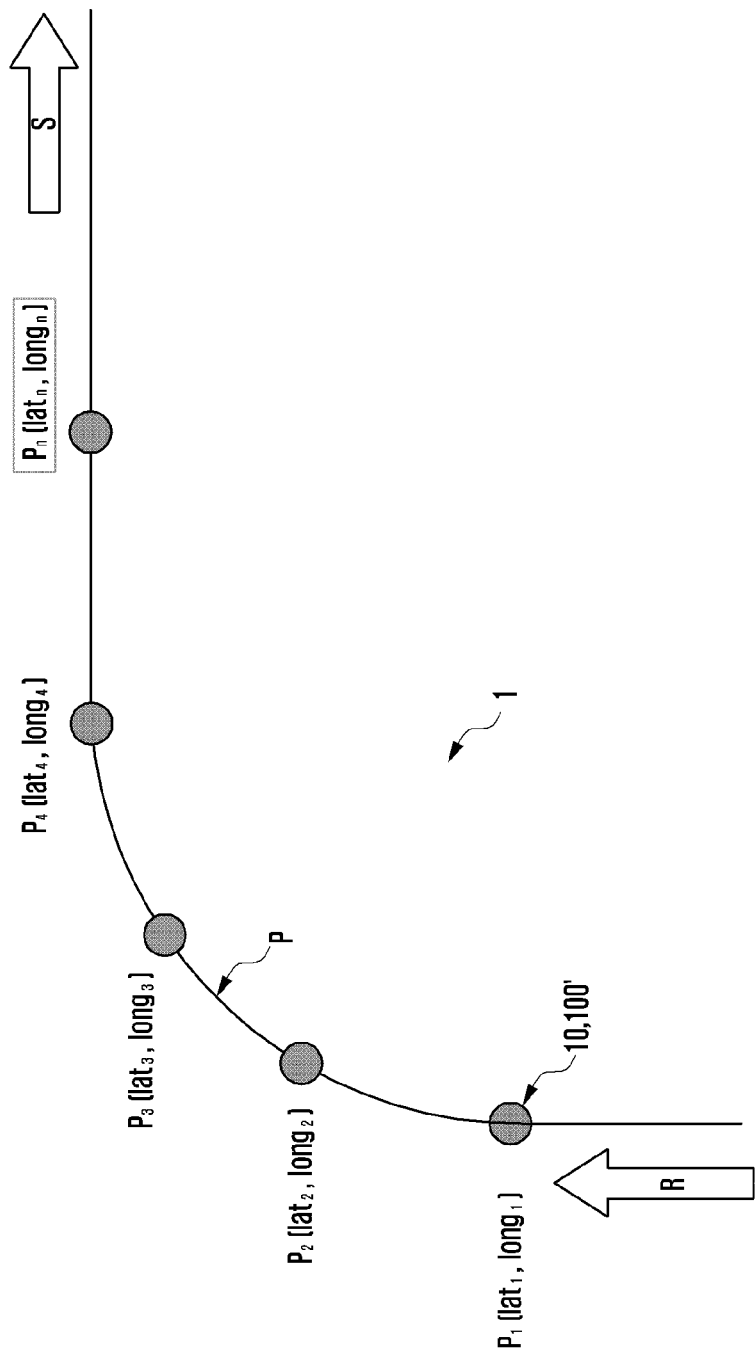
FIG. 9 schematically depicts tracking vehicle location.

FIG. 9 schematically depicts tracking vehicle location (in plan view), according to a conventional UE 100' included in a vehicle 10. The network 1, for example a peer-to-peer network or a cellular network, comprises the set of user equipment, UE, devices, including the first UE 100'.

The vehicle 10 is moving along a path P. In this example, the path P is an arcuate path, having an initial direction R and a final direction S, orthogonal thereto. In other words, the vehicle 10 is moving around a bend to the right.

The UE 100' is arranged to determine second information related to the UE 100' amongst a second set and transmit the second information. In this example, the second information related to the UE 100' is location of the UE 100' (i.e. of the vehicle 10), given by latitude (lat) and longitude (long) thereof, as determined by GNSS. In this example, the second set comprises n locations: $P_1$ ($lat_1$, $long_1$), $P_2$ ($lat_2$, $long_2$), $P_3$ ($lat_3$, $long_3$), $P_4$ ($lat_4$, $long_4$) ... $P_n$ ($lat_n$, $long_n$). The second set is included in the pathHistory Data Frame of the LF Container (BasicVehicleContainerLowFrequency), as described above.

Figure 10:
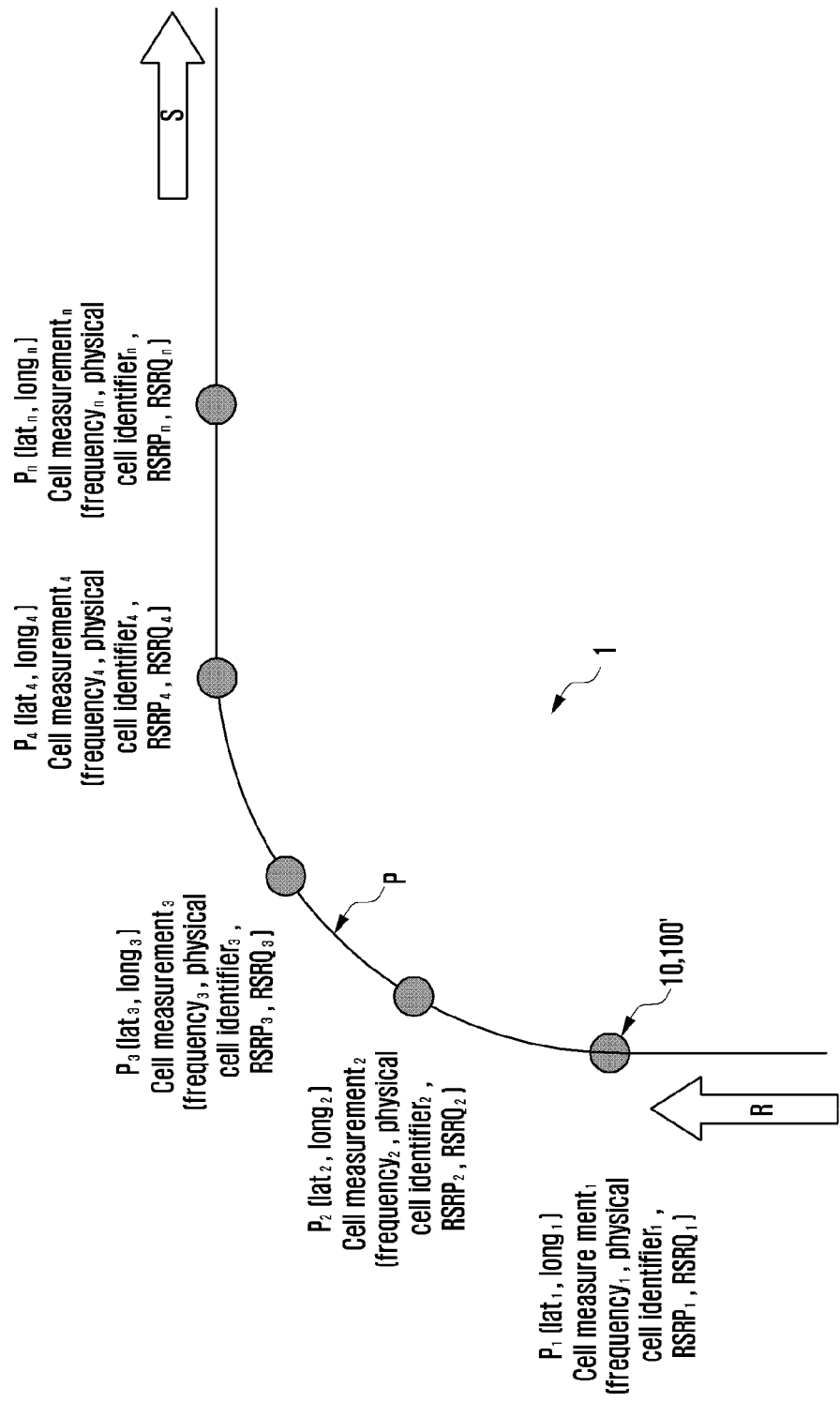
FIG. 10 schematically depicts tracking vehicle location according to an exemplary embodiment of the invention.

FIG. 10 schematically depicts tracking vehicle location (in plain view) according to an exemplary embodiment of the invention. A first UE 100 is included in the first vehicle 10. The network 1, for example a peer-to-peer network or a cellular network, comprises the set of user equipment, UE, devices, including the first UE 100 and the second UE 200 (not shown).

As described above with reference to FIG. 9, the first vehicle 10 is moving along a path P. In this example, the path P is an arcuate path, having an initial direction R and a final direction S, orthogonal thereto. In other words, the vehicle 10 is moving around a bend to the right.

The first UE 100 is arranged to determine second information related to the first UE 100 amongst a second set and transmit the second information. In this example, the second information related to the first UE 100 is location of the first UE 100 (i.e. of the first vehicle 10), given by latitude (lat) and longitude (long) thereof, as determined by GNSS. In this example, the second set comprises n values for n locations:

$P_1$ ($lat_1$, $long_1$);
$P_2$ ($lat_2$, $long_2$):
$P_3$ ($lat_3$, $long_3$);
$P_4$ ($lat_4$, $long_4$); ...
$P_n$ ($lat_n$, $long_n$).

The second set is included in the pathHistory Data Frame of the LF Container (BasicVehicleContainerLowFrequency), as described above.

In contrast with the conventional UE 100' described above, the first UE 100 is arranged to determine first information related to the network amongst a first set and transmit the first information. The second information corresponds to the first information. In this example, the first information related to the network is cell measurements of the network, including frequency, physical cell identifier, RSRP and RSRQ. In this example, the first set comprises n values for n locations (i.e. for the respective n values of the second set):

Cell Measurement$_1$ (frequency$_1$, physical cell identifier$_1$, RSRP$_1$, RSRQ$_1$);
Cell Measurement$_2$ (frequency$_2$, physical cell identifier$_2$, RSRP$_2$, RSRQ$_2$);
Cell Measurement$_3$ (frequency$_3$, physical cell identifier$_3$, RSRP$_3$, RSRQ$_3$);
Cell Measurement$_4$ (frequency$_4$, physical cell identifier$_4$, RSRP$_4$, RSRQ$_4$); . . .
Cell Measurement$_n$ (frequency$_n$, physical cell identifier$_n$, RSRP$_n$, RSRQ$_n$).

Typically, if the same cell is measured, frequency and physical cell identifier do not change between measurements.

The second set is additionally included in the pathHistory Data Frame of the LF Container (BasicVehicleContainer-LowFrequency), by modification, adaptation and/or extension thereof. In other words, the pathHistory Data Frame includes both the network information (first information) and the corresponding location (second information), for example as n value pairs:

P$_1$ (lat$_1$, long$_1$), Cell Measurement$_1$ (frequency$_1$, physical cell identifier$_1$, RSRP$_1$, RSRQ$_1$);
P$_2$ (lat$_2$, long$_2$), Cell Measurement$_2$ (frequency$_2$, physical cell identifier$_2$, RSRP$_2$, RSRQ$_2$);
P$_3$ (lat$_3$, long$_3$), Cell Measurement$_1$ (frequency$_3$, physical cell identifier$_1$, RSRP$_3$, RSRQ$_3$);
P$_4$ (lat$_4$, long$_4$): Cell Measurement$_4$ (frequency$_4$, physical cell identifier$_4$, RSRP$_4$, RSRQ$_4$);
P$_n$ (lat$_n$, long$_n$), Cell Measurement$_n$ (frequency$_n$, physical cell identifier$_n$, RSRP$_n$, RSRQ$_n$).

Typically, if the same cell is measured, frequency and physical cell identifier do not change between measurements.

To predict mobile network signal coverage change (in vehicles surrounding HV i.e. the first vehicle 10 including the first UE 100) measured on C-V2X Uu interface of the HV, new information (i.e. first information) related to the measured mobile network cell signal identifier, power and quality (e.g. for LTE: cell frequency, physical cell identifier, RSRP and RSRQ) to every PathPoint in the pathHistory of the HV CAM/BSM broadcasted messages. By tracking the RSRP and RSRQ measurements along with the position in the pathHistory, the receiving vehicle (i.e. the second vehicle 20 including the second UE 200) would be able to track (predict) mobile network signal coverage changes from the vehicle(s) (i.e. the first vehicle 10 including the first UE 100) in front of him (travelling both in the same or the opposite directions) as shown in FIG. 10.

The particularly novel part in this approach includes combining mobile cell measurements tracking performed by the cellular modem (i.e. the first UE 100) with vehicle location tracking (i.e. the first vehicle 10) to predict signal coverage change (i.e. by the second UE 200, for example included in the second vehicle 20).

Figure 11:
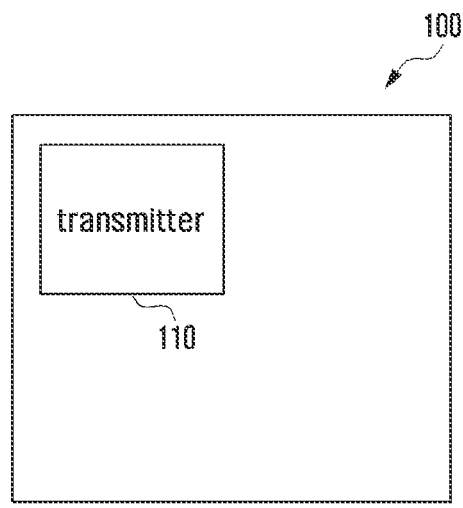
FIG. 11 schematically depicts a user equipment, UE, device according to an exemplary embodiment of the invention.

FIG. 11 schematically depicts a user equipment, UE, device 100 according to an exemplary embodiment of the invention.

The UE device 100 is arranged to determine first information related to a network and corresponding second information related to the UE and transmit the first information and the corresponding second information.

Optionally, the UE device 100 is arranged to identify a first event amongst a set of events and transmit first information related to the identified first event, as described herein.

In this example, UE 100 comprises and/or is a transmitter device, comprising a transmitter 110. In this example, UE 100 supports V2X communication for vehicle-to-vehicle (V2V), vehicle-to-infrastructure (V2I), and vehicle-to-pedestrian (V2P) communication. For example, the UE 100 may be included in a vehicle, infrastructure or a VRU device. The UE 100 controls the transmitter 110 to transmit according to communication protocols used in C-ITS. The transmitter 110 is a wireless transmitter using C-V2X (LTE-V2X or NR-V2X standards) radio access technology on PC5 and Uu interface.

Figure 12:
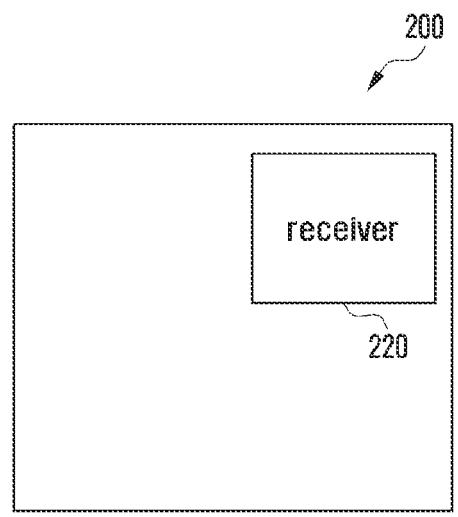
FIG. 12 schematically depicts a user equipment, UE, device according to an exemplary embodiment of the invention.

FIG. 12 schematically depicts a user equipment, UE, device 200 according to an exemplary embodiment of the invention.

The UE device 200 is arranged to receive first information related to a network and corresponding second information related to another UE and determine a first state amongst a set of states of the network based on the transmitted first information and the transmitted corresponding second information, responsive to receiving the transmitted first information and the transmitted corresponding second information.

Optionally, the UE device 200 is arranged to receive the transmitted first information and initiate a first action amongst a set of actions, responsive to the received first information, as described herein.

In this example, UE 200 comprises and/or is a receiver device, comprising a receiver 220. In this example, UE 200 supports V2X communication for vehicle-to-vehicle (V2V), vehicle-to-infrastructure (V2I), and vehicle-to-pedestrian (V2P) communication. For example, the UE 200 may be included in a vehicle, infrastructure or a VRU device. The UE 200 controls the receiver 220 to receive according to communication protocols used in C-ITS. The receiver 220 is a wireless receiver using LTE-V2X or NR-V2X standards.

Figure 13:
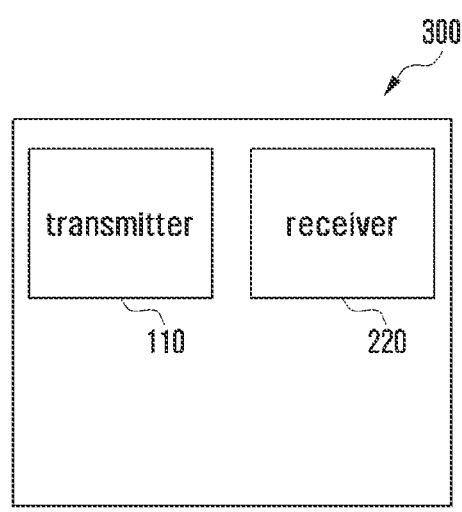
FIG. 13 schematically depicts a user equipment, UE, device according to an exemplary embodiment of the invention.

FIG. 13 schematically depicts a user equipment, UE, device 300 according to an exemplary embodiment of the invention.

In this example, UE 300 comprises and/or is a transceiver device, comprising a transmitter 110 and a receiver 220, as described with reference to FIG. 11 and FIG. 12, respectively.

Figure 14:
FIG. 14 shows the configuration of a user equipment according to an embodiment of the disclosure.

FIG. 14 shows the configuration of a user equipment (UE) according to an embodiment of the disclosure.

Referring to FIG. 14, the UE may include a transceiver 1410, a controller 1420, and a storage unit 1430. In the embodiment, the controller 1420 may be defined as a circuit, an application-specific integrated circuit, or at least one processor.

The transceiver 1410 may transmit/receive signals to/from other network entities. The controller 1420 may control overall operations of the UE according to the embodiment proposed in the disclosure. The storage unit 1430 may store at least one piece of information transmitted/received through the transceiver 1410 and information produced through the controller 1020.

Figure 15:
FIG. 15 shows the configuration of a base station according to an embodiment of the disclosure.

FIG. 15 shows the configuration of a base station according to an embodiment of the disclosure. The base station may correspond to the RAN node in the respective embodiments.

Referring to FIG. 15, the base station may include a transceiver 1510, a controller 1520, and a storage unit 1530.

In the embodiment, the controller 1520 may be defined as a circuit, an application-specific integrated circuit, or at least one processor.

The transceiver 1510 may transmit/receive signals to/from other network entities. The controller 1520 may control overall operations of the base station according to the embodiment proposed in the disclosure. The storage unit 1530 may store at least one piece of information transmitted/received through the transceiver 1510 and information produced through the controller 1520.

Although a preferred embodiment has been shown and described, it will be appreciated by those skilled in the art that various changes and modifications might be made without departing from the scope of the invention, as defined in the appended claims and as described above.

For example, in the examples, RRC measurements and events reporting mechanism are extended to PC5 sidelink radio interface. However, as an additional and/or alternative implementation, the measurement event configuration, trigger and reporting mechanisms may be extended to other types of vehicle sensors and corresponding interfaces i.e., camera, RADAR and/or LIDAR. This may be applicable to the exchange of vehicle sensor information in V2V to increase the awareness of the environment in the cooperative manner.

For example, in the examples, use is made of radio signal measured quantities (e.g. RSRP or RSRQ in LTE) for event triggering. However, as an additional and/or alternative implementation, other types of events applicable to QoS which may be shared with other vehicles include latency, bitrate and/or data buffer occupancy rate.

In summary, a method of controlling a network, preferably a peer-to-peer network, is provided. A second UE (a sink or a target) initiates a first action, responsive to a received first information from a first UE (a source), thereby maintaining and/or enhancing safety, for example, even if a quality of service (QoS) is degraded. That is, the first UE and the second UE operate cooperatively. That is changes to the QoS are mitigated, so as to ensure, maintain and/or enhance safety, for example in C-ITS using V2X communication. In one example, use of 3GPP RRC protocol cell measurements configuration and events reporting mechanism used for UE mobility in 3G, 4G and 5G cellular network may be extended to V2X communications to benefit related C-ITS applications. There is also an additional benefit in predicting mobility procedures in a vehicle UE (e.g. handover) which may be beneficial in improving its performance (more time for neighbour cells measurements in the UE, less dropped calls) in highly dynamic vehicular environment e.g. cars travelling fast on a motorway. A Uu interface radio coverage event triggering framework in combination with dynamic physical characteristic of the vehicle provided in CAM or BSM messages transmitted on sidelink (PC5) interface enables other vehicles predict upcoming network signal coverage changes. As a result, there are two main advantages:

1. Corresponding C-ITS application reaction time for the QoS change is extended which may contribute to improved application performance (more time for vehicle behaviour reconfiguration, lower risk of road accident, improved passenger safety etc.).
2. Similar prediction and performance improvement aspects apply to UE mobility procedures in the mobile network (network controlled cell handover and UE autonomous cell reselection) could be predicted in highly dynamic vehicular scenarios.

In other words, the new method enables improved network coverage and indirectly QoS prediction which is beneficial for C-V2X devices and ITS applications.

A method of controlling a network, including a first UE and a second UE, is described. The first UE determines and transmits first information related to the network amongst a first set and corresponding second information related to the first UE amongst a second set. The second UE receives the transmitted first information and the transmitted corresponding second information and determines a first state amongst a set of states of the network based on the transmitted first information and the transmitted corresponding second information, responsive to receiving the transmitted first information and the transmitted corresponding second information. A network and a UE are also described.

In this way, to predict mobile network signal coverage change by vehicles surrounding a host vehicle (HV) measured, for example, on C-V2X Uu interface of the HV, new information (i.e. first information) related to the measured mobile network cell signal identifier, power and quality (e.g. for LTE: cell frequency, physical cell identifier, RSRP and RSRQ) may be included with every PathPoint in the pathHistory of HV CAM/BSM broadcasted messages, for example. By tracking the RSRP and RSRQ measurements along with the position in the pathHistory, the receiving vehicle (i.e. the second UE) would be able to track (predict) mobile network signal coverage changes from the vehicle(s) in front of him (travelling both in the same or the opposite directions). The particularly novel part in this approach includes combining mobile cell measurements tracking performed by the cellular modem (i.e. the first UE, for example in included in a first vehicle) with vehicle location tracking to predict signal coverage change (i.e. by the second UE, for example included in a second vehicle).

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

What is claimed is:

1. A method performed by a first user equipment (UE) in a wireless communication system, the method comprising:
    establishing a PC5 interface with a second UE;
    receiving, from the second UE, a radio resource control (RRC) configuration to configure a measurement via the PC5 interface;

measuring a reference signal received power (RSRP) of a reference signal of a base station based on the RRC configuration; and transmitting, to the second UE, information including the RSRP.

2. The method of claim 1, further comprising:

identifying whether an event of predefined events is triggered, wherein the information including the RSRP is reported to the second UE, in case that the event of predefined events is triggered.

3. The method of claim 2, wherein the predefined events include a first event in which a parameter associated with a serving cell is greater than a threshold and a second event in which the parameter associated with the serving cell is less than the threshold.

4. The method of claim 2, wherein identifying whether the event of predefined events is triggered comprises comparing the measured RSRP with a threshold, and wherein the event is triggered in case that the measured RSRP is below the threshold.

5. A method performed by a second user equipment (UE) in a wireless communication system, the method comprising:

establishing a PC5 interface with a first UE;

transmitting, to the first UE, a radio resource control (RRC) configuration to configure a measurement via the PC5 interface; and receiving, from the first UE, information including a reference signal received power (RSRP) based on the RRC configuration, wherein the RSRP is based on a reference signal of a base station.

6. The method of claim 5, wherein the information including the RSRP is received, in case that an event of predefined events is triggered.

7. The method of claim 6, wherein the predefined events include a first event in which a parameter associated with a serving cell is greater than a threshold and a second event in which the parameter associated with the serving cell is less than the threshold.

8. The method of claim 6, wherein the event is triggered in case that the RSRP is below a threshold.

9. A first user equipment (UE) comprising:

a transceiver; and a controller configured to:

establish a PC5 interface with a second UE, receive, from the second UE, a radio resource control (RRC) configuration to configure a measurement via the PC5 interface, measure a reference signal received power (RSRP) of a reference signal of a base station based on the RRC configuration, and transmit, to the second UE, information including the RSRP.

10. The first UE of claim 9, wherein the controller is further configured to identify whether an event of predefined events is triggered, and wherein the information including the RSRP is reported to the second UE, in case that the event of predefined events is triggered.

11. The first UE of claim 10, wherein the predefined events include a first event in which a parameter associated with a serving cell is greater than a threshold and a second event in which the parameter associated with the serving cell is less than the threshold.

12. The first UE of claim 10, wherein the controller is configured to compare the measured RSRP with a threshold, and wherein the event is triggered in case that the measured RSRP is below the threshold.

13. A second user equipment (UE) comprising:

a transceiver; and a controller configured to:

establish a PC5 interface with a first UE, transmit, to the first UE, a radio resource control (RRC) configuration to configure a measurement via the PC5 interface, and receive from the first UE, information including a reference signal received power (RSRP) based on the RRC configuration, wherein the RSRP is based on a reference signal of a base station.

14. The second UE of claim 13, wherein the information including the RSRP is received, in case that an event of predefined events is triggered.

15. The second UE of claim 14, wherein the predefined events include a first event in which a parameter associated with a serving cell is greater than a threshold and a second event in which the parameter associated with the serving cell is less than the threshold.

16. The second UE of claim 14, wherein the event is triggered in case that the RSRP is below a threshold.

17. The method of claim 1, wherein the information including the RSRP is transmitted periodically or is transmitted by triggering of an event.

18. The method of claim 1, wherein the information further includes information on a location of the first UE.

* * * * *